(12) United States Patent
Nittono et al.

(10) Patent No.: US 9,765,862 B2
(45) Date of Patent: Sep. 19, 2017

(54) CONTINUOUSLY VARIABLE TRANSMISSION

(71) Applicant: Kabushiki Kaisha F.C.C., Hosoe-cho, Kita-ku, Hamamatsu-shi (JP)

(72) Inventors: Tadahiro Nittono, Hamamatsu (JP); Bo Liu, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 15/223,675

(22) Filed: Jul. 29, 2016

(65) Prior Publication Data

US 2017/0037943 A1 Feb. 9, 2017

(30) Foreign Application Priority Data

Aug. 7, 2015 (JP) .................................. 2015-156943

(51) Int. Cl.
*F16H 15/40* (2006.01)
*F16H 15/36* (2006.01)

(52) U.S. Cl.
CPC .............. *F16H 15/40* (2013.01); *F16H 15/36* (2013.01)

(58) Field of Classification Search
CPC ........... F16H 15/40; F16H 15/02; F16H 15/01
See application file for complete search history.

(56) References Cited

U.S. PATENT DOCUMENTS

| | | | | |
|---|---|---|---|---|
| 2,299,857 A | * | 10/1942 | Solness | ................... F16H 15/38 318/10 |
| 2,850,910 A | * | 9/1958 | Kraus | ................. F16H 61/6647 476/1 |
| 4,744,261 A | | 5/1988 | Jacobson | |
| 5,419,746 A | * | 5/1995 | Nakano | ................... F16H 15/38 476/10 |
| 6,238,318 B1 | | 5/2001 | Itoh et al. | |
| RE41,892 E | * | 10/2010 | Miller | ................... B62K 3/002 476/36 |

(Continued)

FOREIGN PATENT DOCUMENTS

| JP | S49-004065 A | 1/1974 |
|---|---|---|
| JP | S62-127556 A | 6/1987 |

(Continued)

OTHER PUBLICATIONS

Decision to Grant mailed Feb. 3, 2016 issued in Japanese Patent Application No. 2015-156943, pp. 1-3.

*Primary Examiner* — David M Fenstermacher
(74) *Attorney, Agent, or Firm* — Polsinelli PC

(57) ABSTRACT

A continuously variable transmission includes a cardioid intermediate transmission body having a cardioid curved surface, an outer cycloid transmission body having an outer cycloid curved surface, an inner cycloid transmission body having an inner cycloid curved surface, an outer press unit, an inner press unit, and a cardioid intermediate transmission body inclining unit. The outer press unit presses one of the outer cycloid transmission body and the cardioid intermediate transmission body to the other side. The inner press unit presses the one to the other side. The cardioid intermediate transmission body inclining unit changes respective positions where the cardioid curved surface rolls on and contacts the outer cycloid curved surface and the inner cycloid curved surface.

12 Claims, 12 Drawing Sheets

(56) References Cited

U.S. PATENT DOCUMENTS 7,909,723 B2 * 3/2011 Triller ................... B60K 6/36
                                                                                                     475/189
8,512,195 B2 * 8/2013 Lohr ..................... F16H 15/28
                                                                                                     475/189

FOREIGN PATENT DOCUMENTS

| JP | H09-026011 A | 1/1997 |
| JP | H11-166605 A | 6/1999 |
| JP | 2015-075148 A | 4/2015 |

* cited by examiner

CONTINUOUSLY VARIABLE TRANSMISSION

CROSS-REFERENCE TO RELATED APPLICATION

This application claims priority from Japanese Patent Application No. 2015-156943 filed with the Japan Patent Office on Aug. 7, 2015, the entire content of which is hereby incorporated by reference.

BACKGROUND

1. Technical Field

The present disclosure relates to a continuously variable transmission.

2. Description of the Related Art

A continuously variable transmission has been used for a self-traveling vehicle such as an automobile and a motorcycle. The continuously variable transmission can continuously change a driving power generated by an engine (a power engine) and transmit the driving power to driving wheels. For example, JP-A-11-166605 discloses a so-called toroidal continuously variable transmission. This continuously variable transmission includes power rollers between input side disks and output side disks opposed to one another. This power roller is inclined (also referred to as "tilted") to the input side disk side or the output side disk side. This transmits a rotary driving power to a driving wheel side while a rotation speed ratio is continuously changed.

SUMMARY

A continuously variable transmission includes: a cardioid intermediate transmission body having a cardioid curved surface, the cardioid curved surface having a linearly symmetrical cross section formed with a cardioid curve, the cardioid intermediate transmission body being supported such that the cardioid curved surface is rotatably drivable around a symmetrical axis and is inclinable to respective directions opposite from one another centering a starting point of the cardioid curve, the cardioid curve forming the cardioid curved surface; an outer cycloid transmission body formed into a ring shape, the outer cycloid transmission body having a concave-shaped outer cycloid curved surface on an inner peripheral surface, the cardioid curved surface rolling on and contacting the outer cycloid curved surface while inclining, the outer cycloid curved surface being constituted of a cycloid curve, the cycloid curve having a moving circle radius twice as large as a moving circle radius of the cardioid curve constituting the cardioid curved surface; an inner cycloid transmission body having a concave-shaped inner cycloid curved surface symmetrical to the outer cycloid curved surface, the inner cycloid curved surface being disposed at a position opposed to the outer cycloid curved surface via the cardioid curved surface, the cardioid curved surface rolling on and contacting the inner cycloid curved surface while inclining; an outer press unit, one of the outer cycloid transmission body and the cardioid intermediate transmission body being disposed to be displaceable back and forth to the other, the outer press unit pressing the one displaceable back and forth to the other side; an inner press unit, one of the inner cycloid transmission body and the cardioid intermediate transmission body being disposed to be displaceable back and forth to the other, the inner press unit pressing the one displaceable back and forth to the other side; and a cardioid intermediate transmission body inclining unit that inclines the cardioid curved surface to the outer cycloid curved surface side or the inner cycloid curved surface side to change respective positions where the cardioid curved surface rolls on and contacts the outer cycloid curved surface and the inner cycloid curved surface. One of the outer cycloid transmission body, the inner cycloid transmission body, and the cardioid intermediate transmission body is supported to rotatably drive as an input side member of rotary driving power to outside, one among the remaining two being supported to rotatably drive as an output side member of the rotary driving power to outside.

BRIEF DESCRIPTION OF THE DRAWINGS

FIG. 7A illustrates a front view of the cardioid rotor, and FIG. 7B is a cross-sectional side view of the cardioid rotor;

DESCRIPTION OF THE EMBODIMENTS

Figure 1:
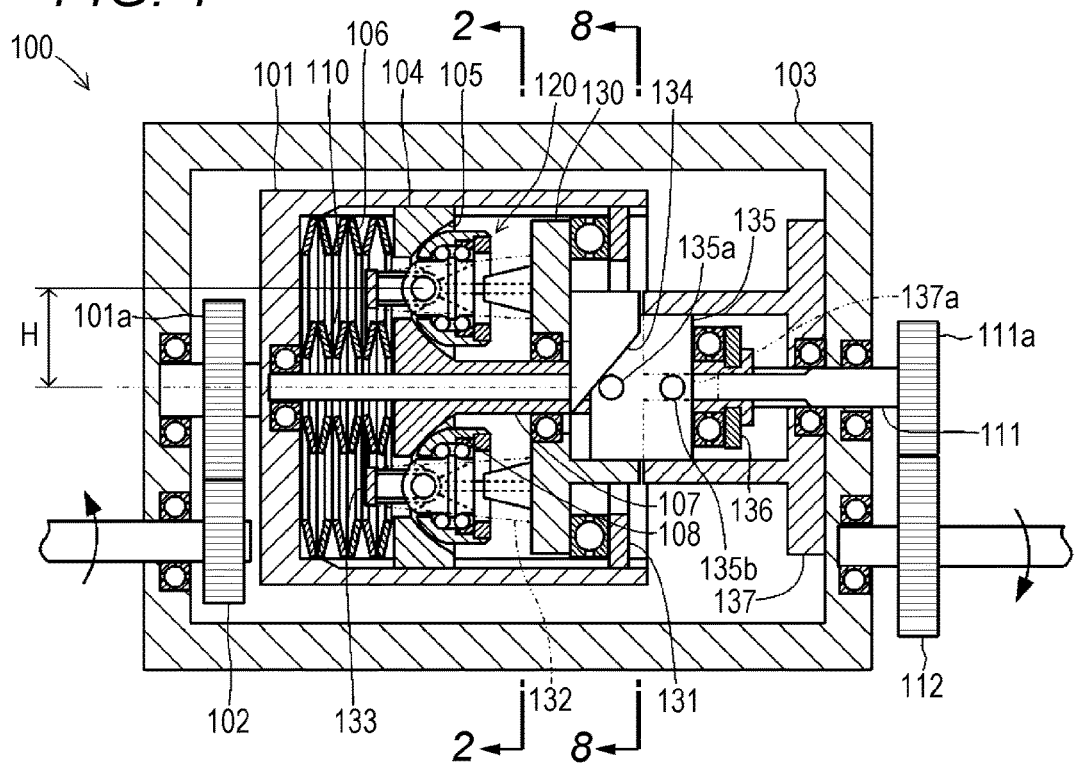
FIG. 1 is a cross-sectional view schematically illustrating an outline of an entire configuration of a continuously variable transmission (in an MID state) according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With the continuously variable transmission described in JP-A-11-166605, the power rollers slidingly friction the input side disks and the output side disks during operation. In view of this, a friction resistance between both or a slip generates a transmission loss of driving power. This degrades a transmission efficiency of the driving power. With the toroidal continuously variable transmission, offsetting (shifting) a rotation shaft of the power roller from rotation shafts of the input side disk and the output side disk inclines the power roller. This needs a hydraulic mechanism to offset the power roller. This makes a device configuration complicated and large-sized.

One object of the present disclosure is to provide the following continuously variable transmission. This continuously variable transmission ensures reducing a loss due to a friction resistance and a slip during operation and improving a transmission efficiency of driving power.

A continuously variable transmission (the present continuously variable transmission) according to an aspect of the present disclosure includes: a cardioid intermediate transmission body having a cardioid curved surface, the cardioid curved surface having a linearly symmetrical cross section formed with a cardioid curve, the cardioid intermediate transmission body being supported such that the cardioid curved surface is rotatably drivable around a symmetrical axis and is inclinable to respective directions opposite from one another centering a starting point of the cardioid curve, the cardioid curve forming the cardioid curved surface; an outer cycloid transmission body formed into a ring shape, the outer cycloid transmission body having a concave-shaped outer cycloid curved surface on an inner peripheral surface, the cardioid curved surface rolling on and contacting the outer cycloid curved surface while inclining, the outer cycloid curved surface being constituted of a cycloid curve, the cycloid curve having a moving circle radius twice as large as a moving circle radius of the cardioid curve constituting the cardioid curved surface; an inner cycloid transmission body having a concave-shaped inner cycloid curved surface symmetrical to the outer cycloid curved surface, the inner cycloid curved surface being disposed at a position opposed to the outer cycloid curved surface via the cardioid curved surface, the cardioid curved surface rolling on and contacting the inner cycloid curved surface while inclining; an outer press unit, one of the outer cycloid transmission body and the cardioid intermediate transmission body being disposed to be displaceable back and forth to the other, the outer press unit pressing the one displaceable back and forth to the other side; an inner press unit, one of the inner cycloid transmission body and the cardioid intermediate transmission body being disposed to be displaceable back and forth to the other, the inner press unit pressing the one displaceable back and forth to the other side; and a cardioid intermediate transmission body inclining unit that inclines the cardioid curved surface to the outer cycloid curved surface side or the inner cycloid curved surface side to change respective positions where the cardioid curved surface rolls on and contacts the outer cycloid curved surface and the inner cycloid curved surface. One of the outer cycloid transmission body, the inner cycloid transmission body, and the cardioid intermediate transmission body is supported to rotatably drive as an input side member of rotary driving power to outside, one among the remaining two being supported to rotatably drive as an output side member of the rotary driving power to outside.

Here, the cycloid curve means a plane curve obtained as a trajectory drawn with fixed points on a circle (referred to as a "moving circle") when the circle rotates on a fixed straight line without a slip. The cardioid curve means a plane curve obtained as a trajectory of fixed points on a circumference of a circle (referred to as a "moving circle") when a circle with a diameter identical to this fixed circle rotates without a slip while the circle contacts a circumference of the fixed circle. The cardioid curve is also referred to as an outer cycloid curve.

The outer press unit and the inner press unit may include an elastic body such as a disc spring, a coil spring, or rubber. Alternatively, the outer press unit and the inner press unit may include various actuators such as a hydraulic piston, a pneumatic piston, or an electric motor. The cardioid intermediate transmission body inclining unit may be a control device produced from a computer that controls the various actuators. Alternatively, the cardioid intermediate transmission body inclining unit may be a machine element (for example, a cam) that transforms a part of the rotary driving power input to the continuously variable transmission into power of inclining the cardioid intermediate transmission body to the outer cycloid transmission body side or the inner cycloid transmission body side.

The present continuously variable transmission includes the cardioid intermediate transmission bodies, which have the cardioid curved surfaces constituted of the cardioid curves, between the outer cycloid curved surface and the inner cycloid curved surface, which are both constituted of the cycloid curves. Inclination of the cardioid intermediate transmission bodies to the outer cycloid transmission body side or the inner cycloid transmission body side changes the rolling contact point. This transmits the rotary driving power of the outer cycloid transmission body, the inner cycloid transmission body, or the cardioid intermediate transmission body, which serves as the input side member, to the outer cycloid transmission body, the inner cycloid transmission body, or the cardioid intermediate transmission body, which serves as the output side member other than the input side member, while the rotation speed ratio is continuously changed.

Regarding this point, the inventors of this application have found the following knowledge. That is, in the present continuously variable transmission, the outer cycloid curved surface and the inner cycloid curved surface are constituted of the cycloid curves. The moving circle radius of the cycloid curve is twice as large as the moving circle radius of the cardioid curve constituting the cardioid curved surface. This allows the cardioid curved surface to roll on and contact the outer cycloid curved surface and the inner cycloid curved surface without the friction resistance and the slip. Accordingly, with the present continuously variable transmission, when the cardioid intermediate transmission bodies are inclined to the outer cycloid transmission body side or the inner cycloid transmission body side for gear shift, the transmission loss of the driving power due to the friction resistance or the slip is less likely to occur. This ensures improving the transmission efficiency of the driving power.

In the present continuously variable transmission, one of the outer cycloid transmission body and the inner cycloid transmission body may serve as the input side member while the other may serve as the output side member. The cardioid intermediate transmission body inclining unit may include the outer press unit or the inner press unit, the outer press unit or the inner press unit pressing the input side member at a pressing force larger than a pressing force by inner press unit or the outer press unit pressing the output side member. Further, when a torque of the outer cycloid transmission body or the inner cycloid transmission body serving as the input side member exceeds a torque of the inner cycloid transmission body or the outer cycloid transmission body serving as the output side member, the cardioid intermediate transmission body inclining unit inclines the cardioid intermediate transmission body to the side of the inner cycloid transmission body or the outer cycloid transmission body serving as the output side member.

According to this aspect, a small torque difference (or a state of no torque difference) possibly occurs between the outer cycloid transmission body or the inner cycloid transmission body, which serves as the input side member, and the inner cycloid transmission body or the outer cycloid transmission body, which serves as the output side member. In this state, the cardioid intermediate transmission body inclines to the side of the outer cycloid transmission body or the inner cycloid transmission body serving as the input side member. In view of this, the present continuously variable transmission enters a state of high gear ratio (the gear ratio with small value), in other words, a high gear state.

Meanwhile, there may be a case where the torque of the outer cycloid transmission body or the inner cycloid transmission body, which serves as the input side member, becomes larger than the torque of the inner cycloid transmission body or the outer cycloid transmission body, which serves as the output side member. In this case, the cardioid intermediate transmission body inclines to the side of the outer cycloid transmission body or the inner cycloid transmission body serving as the output side member. In view of this, the present continuously variable transmission enters a state of low gear ratio (the gear ratio with large value), in other words, a low gear state.

Thus, with the present continuously variable transmission, only when the torque on the input side for rotary driving power is larger than the torque on the output side for rotary driving power such as at a start of moving the vehicle and at sudden acceleration, the cardioid intermediate transmission body inclines to the output side member side and the present continuously variable transmission enters in the low gear state. This ensures simplifying the device configuration and a gear shift control of the present continuously variable transmission.

In the present continuously variable transmission, the cardioid intermediate transmission body inclining unit may include a cam, the cam inclining the cardioid intermediate transmission body to the side of the inner cycloid transmission body or the outer cycloid transmission body serving as the output side member using a power of the torque difference.

According to this aspect, the cardioid intermediate transmission body inclining unit includes the cam. This cam inclines the cardioid intermediate transmission body to the side of the inner cycloid transmission body or the outer cycloid transmission body serving as the output side member using the power of torque difference. This ensures simplifying the configuration of and reducing the weight of the present continuously variable transmission.

In the present continuously variable transmission, the cardioid intermediate transmission body inclining unit may relatively change a pressing force from the outer press unit and a pressing force from the inner press unit to change respective positions of the outer cycloid transmission body and the inner cycloid transmission body with respect to the cardioid intermediate transmission body, so as to incline the cardioid curved surface to the outer cycloid curved surface side or the inner cycloid curved surface side.

According to this aspect, the cardioid intermediate transmission body inclining unit relatively changes the pressing force from the outer press unit and the pressing force from the inner press unit to change the respective positions of the outer cycloid transmission body and the inner cycloid transmission body with respect to the cardioid intermediate transmission body. This inclines the cardioid curved surface to the outer cycloid curved surface side or the inner cycloid curved surface side. In view of this, adjusting the respective pressing force from the outer press unit and pressing force from the inner press unit ensures easy adjustment of the orientation of inclination and an amount of inclination of the cardioid intermediate transmission body.

In the present continuously variable transmission, the cardioid intermediate transmission body may have a striking curved surface formed of a curved surface, the striking curved surface being formed on a side opposite from a direction where the cardioid curved surface receives a pressing force from the outer press unit and the inner press unit. Further, the two cardioid intermediate transmission bodies with the striking curved surfaces may be disposed with the respective striking curved surfaces struck against one another.

According to this aspect, the two cardioid intermediate transmission bodies include the respective striking curved surfaces, which are formed on the side opposite from the cardioid curved surface, are struck against one another. Accordingly, the cardioid intermediate transmission bodies, which are disposed back to back to one another, can mutually receive the pressing forces applied to the respective cardioid curved surfaces. This restrains the components other than the components on which the cardioid curved surface and the striking curved surface are formed to receive the pressing forces from the outer press unit and the inner press unit. This ensures improving the durability of the present continuously variable transmission.

First Embodiment

Figure 2:
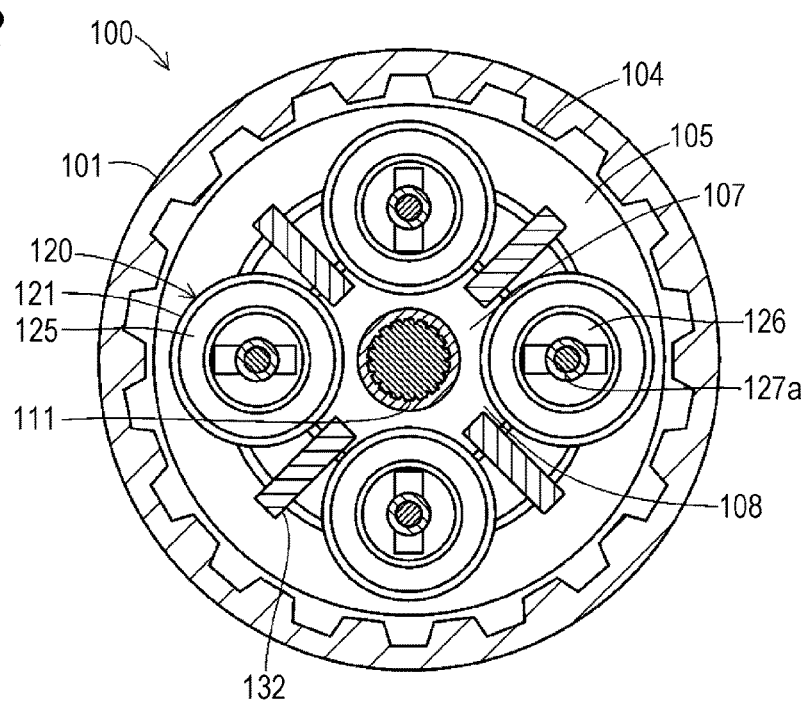
FIG. 2 is a cross-sectional view schematically illustrating an outline of an internal constitution of main parts in the continuously variable transmission viewed from line 2-2 indicated in FIG. 1.

The following describes the first embodiment, which is one embodiment of a continuously variable transmission according to the present disclosure, with reference to the drawings. FIG. 1 is a cross-sectional view schematically illustrating an outline of an entire configuration of a continuously variable transmission 100 according to the first embodiment. FIG. 2 is a cross-sectional view schematically illustrating an outline of an internal constitution of the continuously variable transmission 100 viewed from line 2-2 indicated in FIG. 1.

The drawings to be referred in this description are each schematically illustrated for ease of understanding of a technique of the present disclosure by exaggeratedly illustrating a part of components and the like. Therefore, dimensions, ratios, and the like between the respective components may differ between the actual components and the illustrated components.

Figure 9:
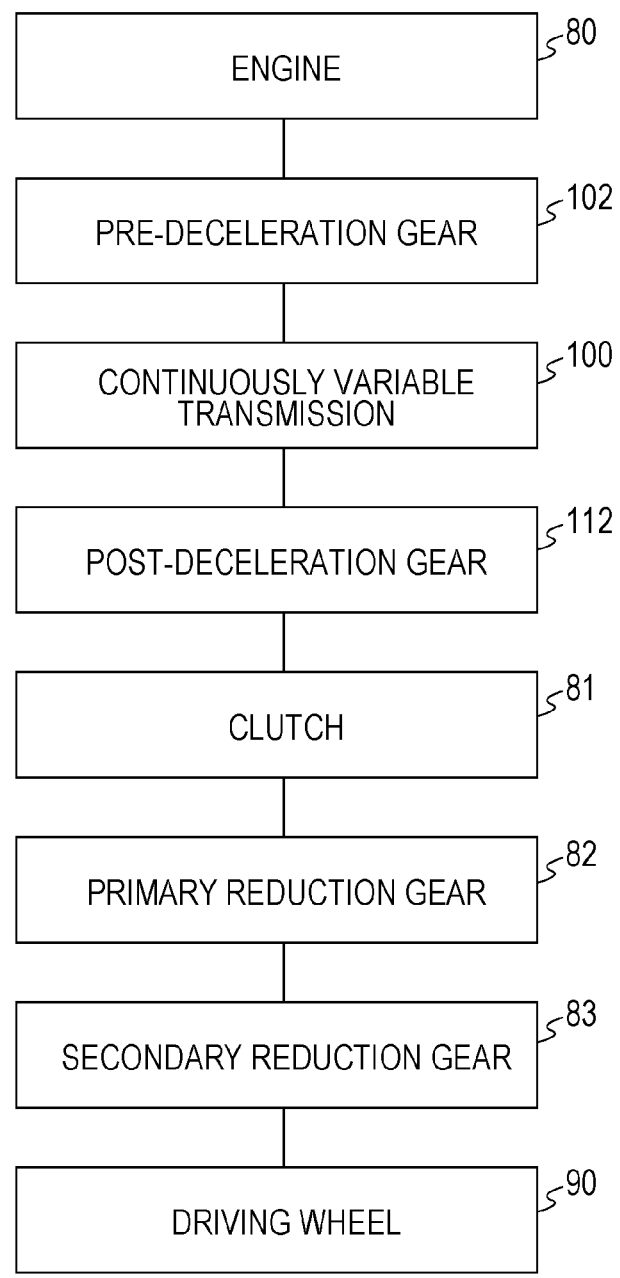
FIG. 9 is a block diagram illustrating a transmission route of rotary driving power from a power engine to a driving wheel in a two-wheeled vehicle that mounts the continuously variable transmission illustrated in FIG. 1.

This continuously variable transmission 100 is a mechanical device that transmits rotary driving power generated by an engine 80, which is a power engine for two-wheeled vehicles (so-called motorcycles) to a driving wheel 90, which is a rear wheel of the two-wheeled vehicle, while continuously changing a gear ratio (see FIG. 9). The continuously variable transmission 100 is disposed around the engine 80 (for example, below a sitting seat or a fuel tank) in the two-wheeled vehicle.

(Configuration of Continuously Variable Transmission 100)

As illustrated in FIG. 1, the continuously variable transmission 100 includes an outer transmission body holder 101. The outer transmission body holder 101 is a metallic component that rotatably drives received rotary driving power from the engine 80 and holds an outer cycloid transmission body 104. The outer transmission body holder 101 is formed into a cylindrical shape with a bottom where one side is open and the other side is obstructed by a sidewall. A shaft body extends from a center of the sidewall on the left side in FIG. 1 of this outer transmission body holder 101. An input gear 101a is disposed on this shaft body. Furthermore, a distal end of this shaft body is rotatably supported to a sidewall of a casing 103.

The input gear 101a is a machine element rotatably driven by the rotary driving power from the engine 80 transmitted via a pre-deceleration gear 102. The input gear 101a rotatably drives integrally with the outer transmission body holder 101. The pre-deceleration gear 102 is a machine element that transmits the rotary driving power from the engine 80 to the input gear 101a with reduced engine speed. The pre-deceleration gear 102 is disposed at a distal end of a crankshaft that extends from the engine 80 and rotatably passes through the casing 103.

The casing 103 is a metallic component constituting an outer chassis of the continuously variable transmission 100 that covers main components constituting the continuously variable transmission 100 such as the outer transmission body holder 101. Meanwhile, the outer cycloid transmission body 104 is disposed at an inner peripheral surface of the outer transmission body holder 101. The outer cycloid transmission body 104 is held by spline fitting with a state where the outer cycloid transmission body 104 is displaceable along an axis line direction of the outer transmission body holder 101 and is integrally rotatable with the outer transmission body holder 101.

The outer cycloid transmission body 104 is a component to change a gear ratio in this continuously variable transmission 100. The outer cycloid transmission body 104 includes a metal material formed into a ring shape. This outer cycloid transmission body 104 has a ring body and has an inner diameter to the extent of surrounding respective outsides of inner cycloid transmission bodies 107 and cardioid intermediate transmission bodies 120, which will be described later. In this embodiment, the outer cycloid transmission body 104 is configured as the ring body having the inner diameter such that the four cardioid intermediate transmission bodies 120 internally contact the outer cycloid transmission body 104.

On the inner peripheral surface of the outer cycloid transmission body 104, a concave-shaped outer cycloid curved surface 105 is formed. The outer cycloid curved surface 105 is a part where a cardioid curved surface 122, which will be described later, rolls and contacts while being inclined. The outer cycloid curved surface 105 has a curved surface of which inner diameter decreases from the cardioid intermediate transmission body 120 side (the right side in FIG. 1) to the far-side of the outer cycloid transmission body 104 (the left side in FIG. 1). More specifically, the outer cycloid curved surface 105 has a concave-shaped curved surface of which cross-sectional shape forms a cycloid curve Cy by a moving circle MCb (see FIG. 4). A moving circle radius b of the moving circle MCb is twice as large as a moving circle radius a of a moving circle MCa in a cardioid curve Ca (the cardioid curve Ca, which is a cross-sectional shape of the cardioid curved surface 122: see FIG. 3) constituting the cardioid curved surface 122 (see FIG. 7A). In this case, an axial length of the outer cycloid transmission body 104 at the outer cycloid curved surface 105 is formed to a length in a range in which the cardioid curved surface 122 rolls, that is, a range in which the cardioid intermediate transmission bodies 120 are inclined.

Figure 3:
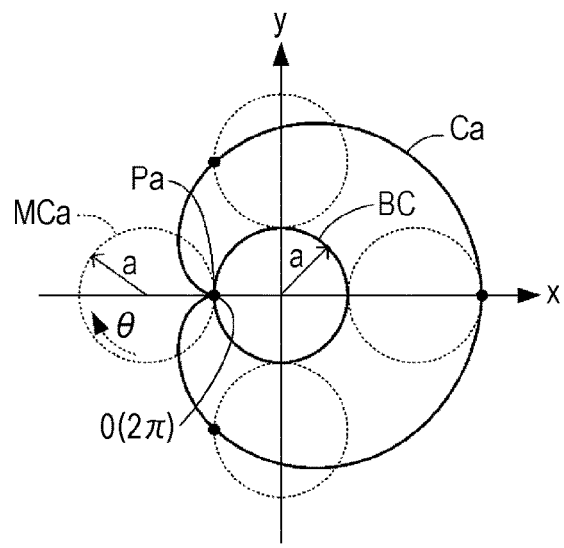
FIG. 3 is an explanatory view for describing a cardioid curve constituting a cardioid intermediate transmission body illustrated in FIG. 1.
Figure 4:
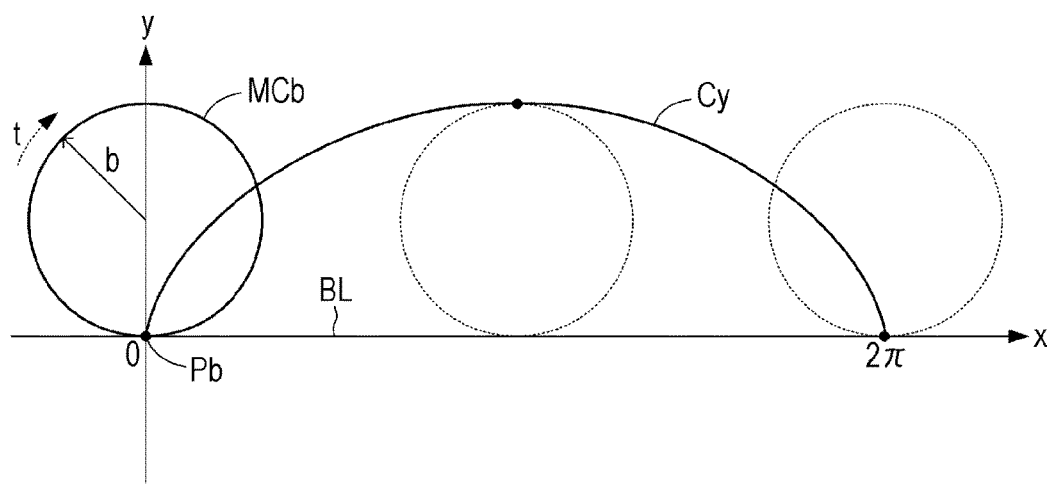
FIG. 4 is an explanatory view for describing a cycloid curve constituting an outer cycloid transmission body and an inner cycloid transmission body illustrated in FIG. 1.

Here, as illustrated in FIG. 3, the cardioid curve Ca is a heart-shaped plane curve obtained as a trajectory of moving points Pa and also referred to as an outer cycloid curve. A moving point Pa is a point on the circumference of the moving circle MCa. The moving circle MCa rotates on a fixed circle BC without a slip while contacting the circumference of the fixed circle BC. The moving circle radius a of the moving circle MCa is identical to a radius of the fixed circle BC. As illustrated in FIG. 4, the cycloid curve Cy is an arc-shaped plane curve obtained as a trajectory drawn with moving points Pb on the moving circle MCb. The moving circle MCb has the moving circle radius b and rotates on a fixed straight line BL without a slip.

As described above, this outer cycloid transmission body 104 is fitted to the inner peripheral surface of the outer transmission body holder 101 with the splines while being pressed by an outer press body 106, which is disposed at an inner bottom of the outer transmission body holder 101. The outer cycloid transmission body 104 rotatably drives concentrically with the outer transmission body holder 101. That is, the outer cycloid transmission body 104 is equivalent to an example of an input side member according to the present disclosure, which rotatably drives by the rotary driving power from the engine 80 received by the continuously variable transmission 100.

The outer press body 106 is an elastic body to constantly press the outer cycloid transmission body 104 to the cardioid intermediate transmission bodies 120. The outer press body 106 has a plurality of disc springs formed into a ring shape. This outer press body 106 constantly presses the outer cycloid transmission body 104 to the cardioid intermediate transmission bodies 120 at a force stronger than a force by an inner press body 110, which will be described later.

The outer cycloid transmission body 104 internally includes the inner cycloid transmission bodies 107. The inner cycloid transmission body 107 is a component to change the gear ratio of the continuously variable transmission 100 collaborating with the outer cycloid transmission body 104. The inner cycloid transmission body 107 is formed by processing a metal material into a cylindrical shape. A concave-shaped inner cycloid curved surface 108 is formed on an outer peripheral surface of one (the left side in FIG. 1) end of this inner cycloid transmission body 107. The inner cycloid curved surface 108 is disposed at a position opposed to the outer cycloid curved surface 105 via the cardioid curved surface 122.

Similar to the outer cycloid curved surface 105, the inner cycloid curved surface 108 is a part where the cardioid curved surface 122 rolls and contacts while being inclined. The inner cycloid curved surface 108 has a curved surface of which outer diameter enlarges from the cardioid intermediate transmission body 120 side (the right side in FIG. 1) to the end side of the inner cycloid transmission body 107. More specifically, the inner cycloid curved surface 108 has a concave-shaped curved surface of which cross-sectional shape forms a curve line symmetrical with respect to the cycloid curve Cy (see FIG. 4), which constitutes the outer cycloid curved surface 105. That is, the inner cycloid curved surface 108 has a concave-shaped curved surface of which cross-sectional shape becomes a curve line symmetrical with respect to the cycloid curve Cy formed by the moving circle MCb. The moving circle radius b of the moving circle MCb is twice as large as the moving circle radius a in the cardioid curve Ca (see FIG. 3) constituting the cardioid curved surface 122 (see FIG. 7A). In this case, an axial length of the inner cycloid transmission body 107 at the inner cycloid curved surface 108 is formed to a length in a range in which the cardioid curved surface 122 rolls, that is, a range in which the cardioid intermediate transmission bodies 120 are inclined.

This inner cycloid transmission body 107 is supported on an output shaft 111 while being pressed by the inner press body 110, which is disposed at the inner bottom of the outer transmission body holder 101. In this respect, the inner cycloid curved surface 108 is disposed at a position opposed to the outer cycloid curved surface 105 of the outer cycloid transmission body 104. The inner press body 110 is an elastic body to constantly press the inner cycloid transmission body 107 to the cardioid intermediate transmission bodies 120. The inner press body 110 has a plurality of disc springs formed into a ring shape. This inner press body 110 constantly presses the inner cycloid transmission body 107 to the cardioid intermediate transmission bodies 120 at a force weaker than a force by the outer press body 106.

The output shaft 111 is a component to output the rotary driving power changed by this continuously variable transmission 100 to the outside. The output shaft 111 includes an axially-extending steel material. On the outer peripheral surface of this output shaft 111, the splines are formed along the axis direction. The outer peripheral surface of the output shaft 111 is fitted to the inner peripheral portion of the inner cycloid transmission body 107 with the splines. Accordingly, the inner cycloid transmission body 107 is displaceable with respect to the output shaft 111 along the axis line direction of the output shaft 111 and supported by the output shaft 111 with a state rotatable integrally with the output shaft 111. That is, the inner cycloid transmission body 107 is equivalent to an example of an output side member according to the present disclosure, which outputs the rotary driving power from the engine 80 changed by the continuously variable transmission 100 to the outside.

The one (the left side in FIG. 1) end of this output shaft 111 is rotatably supported to the center of the sidewall of the outer transmission body holder 101. Furthermore, the other (the right side in FIG. 1) end side of the output shaft 111 passes through the casing 103 to be rotatably supported by the casing 103. An output gear 111a is disposed at the other (the right side in FIG. 1) end of the output shaft 111. The output gear 111a is a machine element that transmits the rotary driving power to a clutch 81 (see FIG. 9) via a post-deceleration gear 112. The output gear 111a rotatably drives integrally with the output shaft 111. The post-deceleration gear 112 is a machine element that transmits the rotary driving power from the output shaft 111 to the clutch 81 with a reduced rotation speed. The post-deceleration gear 112 is disposed on a transmission shaft rotatably supported to the casing 103.

Figure 7A:
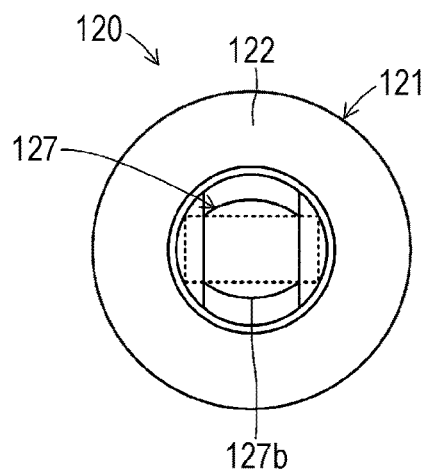
FIGS. 7A and 7B illustrate an outline of an entire configuration of a cardioid rotor in the cardioid intermediate transmission body illustrated in FIG. 1.
Figure 7B:
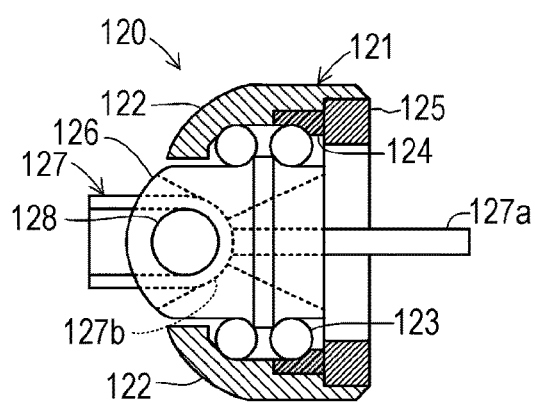

The cardioid intermediate transmission bodies 120 are disposed between the outer cycloid transmission body 104 and the inner cycloid transmission body 107. The cardioid intermediate transmission body 120 is a component that collaborates with both the outer cycloid transmission body 104 and the inner cycloid transmission body 107 to change the gear ratio of the continuously variable transmission 100. As illustrated in FIGS. 7A and 7B, the cardioid intermediate transmission body 120 mainly includes a cardioid rotor 121, an inclined sleeve 126, a rotator supporting pillar 127, and a sliding pin 128. The cardioid intermediate transmission body 120 has the cardioid curved surface 122 of which cross-sectional surface is formed to be linearly symmetrical by the cardioid curve Ca. The cardioid intermediate transmission bodies 120 are supported such that the cardioid curved surfaces 122 can rotatably drive around a symmetrical axis and the respective cardioid curved surfaces 122 can be inclined in directions opposite from one another centering a starting point of the cardioid curve Ca, which forms the cardioid curved surface 122.

As details are illustrated in FIGS. 5, 6, 7A, and 7B, while the cardioid rotor 121 rolls on and contacts the outer cycloid curved surface 105 and the inner cycloid curved surface 108, the cardioid rotor 121 is inclined (also referred to as "tilted") to the outer cycloid curved surface 105 side or the inner cycloid curved surface 108 side. Accordingly, the cardioid rotor 121 transmits the rotary driving power between the outer cycloid transmission body 104 and the inner cycloid transmission body 107 while changing the rotary driving power. The cardioid rotor 121 includes a steel material formed into a cylindrical shape. The cardioid curved surface 122 is formed on the outer peripheral surface on the one (the left side in FIG. 5) end side of this cardioid rotor 121.

The cardioid curved surface 122 is a curved surface area that actually rolls on and contacts both the outer cycloid curved surface 105 and the inner cycloid curved surface 108. The cardioid curved surface 122 is circumferentially formed across the whole outer peripheral surface of the cardioid rotor 121. This cardioid curved surface 122 is a convex-shaped curved surface of which cross-sectional shape forms the cardioid curve Ca. The cardioid curved surface 122 has a shape of which outer diameter decreases as approaching to the distal end of the cardioid rotor 121. In this case, the cardioid curved surface 122 is formed into an axisymmetric shape. That is, the longitudinal cross-sectional shape of the cardioid rotor 121 (see FIG. 7B) has a symmetrical shape with a center line (the x-axis in FIG. 3) passing through a starting point (0 (2 π) in FIG. 3) of the cardioid curve Ca and the center of the fixed circle BC as the symmetrical axis. In FIG. 7B, the cardioid curved surface 122 is illustrated as vertically symmetrical. In this case, the outer diameter of the cardioid rotor 121 and the axial length of the cardioid rotor 121 in the cardioid curved surface 122 are appropriately selected according to a distance H from an axial line of the output shaft 111 and a range of a gear ratio (ratio) demanded for the continuously variable transmission 100. Thus, the cardioid rotor 121 is formed into a cannonball shape as a whole.

This cardioid rotor 121 is held by the inclined sleeve 126. The inclined sleeve 126 is disposed inside the cardioid rotor 121 via bearings 123. The bearings 123 are ring-shaped machine elements. The bearing 123 rotatably hold the cardioid rotor 121 on the outer peripheral surface of the inclined sleeve 126. The bearings 123 are axially arrayed in two rows on the outer peripheral surface of the inclined sleeve 126. In this case, the cardioid rotor 121 internally houses the bearings 123 by ring-shaped bearing receivers 124 and ring-shaped pressing screws 125. The pressing screws 125 secure the bearing receivers 124 to the inside of the cardioid rotor 121.

The inclined sleeve 126 is a component that includes a metal material processed into a cylindrical shape. The inclined sleeve 126 rotatably holds the cardioid rotor 121 via the bearings 123. The inside of this inclined sleeve 126 is formed to have a tubular shape where the internal shape of both ends is decreasingly narrowed down to the center (indicated by the dashed line in FIG. 7B). The rotator supporting pillar 127 passes through this part. The rotator supporting pillar 127 is a component to support the inclined sleeve 126 such that the inclined sleeve 126 can be inclined to the outer cycloid transmission body 104 or the inner cycloid transmission body 107 side with the inclined sleeve 126 parallel to the output shaft 111.

More specifically, the rotator supporting pillar 127 is formed into a bar shape. The rotator supporting pillar 127 is installed across a rotator support base 130 and a sub-support base 133, which will be described later. The rotator supporting pillar 127 includes a pillar 127a and a cylindrically formed slider 127b. The pillar 127a extends to the rotator support base 130 side in a bar shape. The slider 127b extends to the sub-support base 133 side in a bar shape. The distal end of the slider 127b rotatably slides inside the inclined sleeve 126. The sliding pin 128 passes through the slider 127b and the inclined sleeve 126. Thus, the rotator supporting pillar 127 can inclinedly support the inclined sleeve 126 to the outer cycloid transmission body 104 or the inner cycloid transmission body 107 side. The pillar 127a is secured on a plate surface of the rotator support base 130. The sliding pin 128 is a component serving as an inclining center of the cardioid rotor 121. The sliding pin 128 is formed by processing a steel material into a round bar shape. The central axis of this sliding pin 128 matches the starting point (0 (2 π) in FIG. 3) of the cardioid curve Ca forming the cardioid curved surface 122.

The rotator support base 130 supports this cardioid intermediate transmission body 120. The rotator support base 130 is a component to support the cardioid intermediate transmission body 120 such that the cardioid curved surface 122 faces both the outer cycloid transmission body 104 and the inner cycloid transmission body 107. The rotator support base 130 is formed by processing a metal material into a disk shape. This rotator support base 130 is supported by the output shaft 111 inside the outer transmission body holder 101 so as to slidably rotate on the outer peripheral surface of the output shaft 111 via the bearings. The plate surface of the rotator support base 130 is in a direction perpendicular to the output shaft 111. In this case, stoppers 131 are disposed on the opening side inside the outer transmission body holder 101 via the bearings. The stopper 131 restricts a displacement of the rotator support base 130 to the opening side.

The four cardioid intermediate transmission bodies 120, which are disposed uniformly in the circumferential direction, are supported to the plate surfaces on the outer cycloid transmission body 104 side and the inner cycloid transmission body 107 side in this rotator support base 130. The cardioid intermediate transmission bodies 120 are each supported so as to have a posture extending to the outer cycloid transmission body 104 and the inner cycloid transmission body 107. Sub-base supporting pillars 132 are disposed between the respective four cardioid intermediate transmission bodies 120 on the plate surface of the rotator support base 130 (see FIG. 2).

Figure 5:
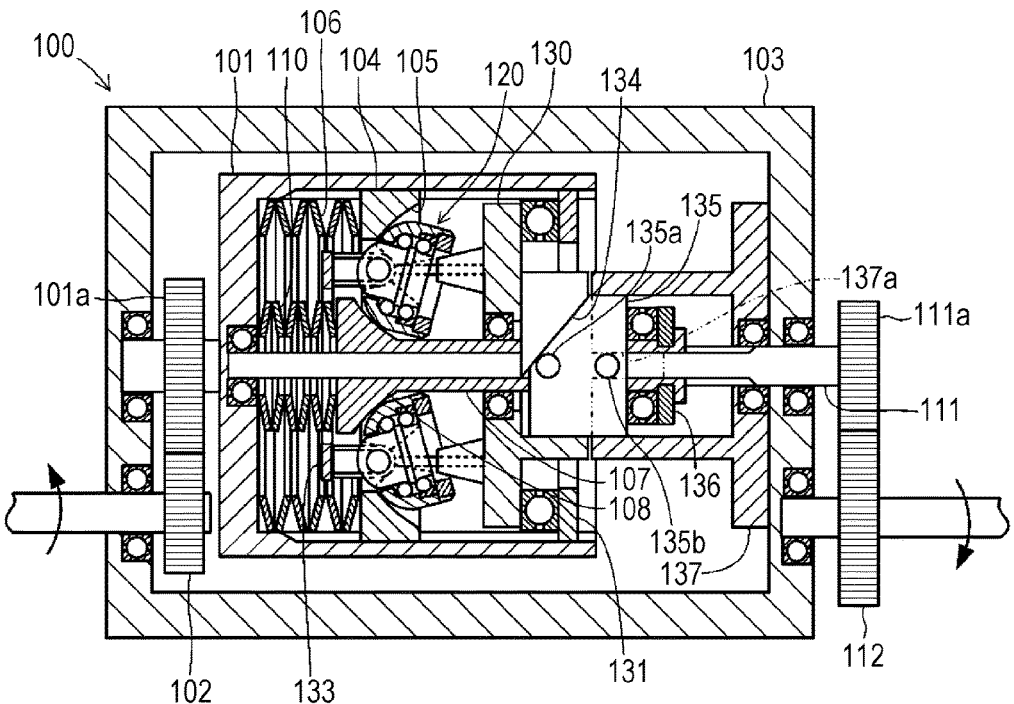
FIG. 5 is a cross-sectional view schematically illustrating the continuously variable transmission (in a TOP state) illustrated in FIG. 1.
Figure 6:
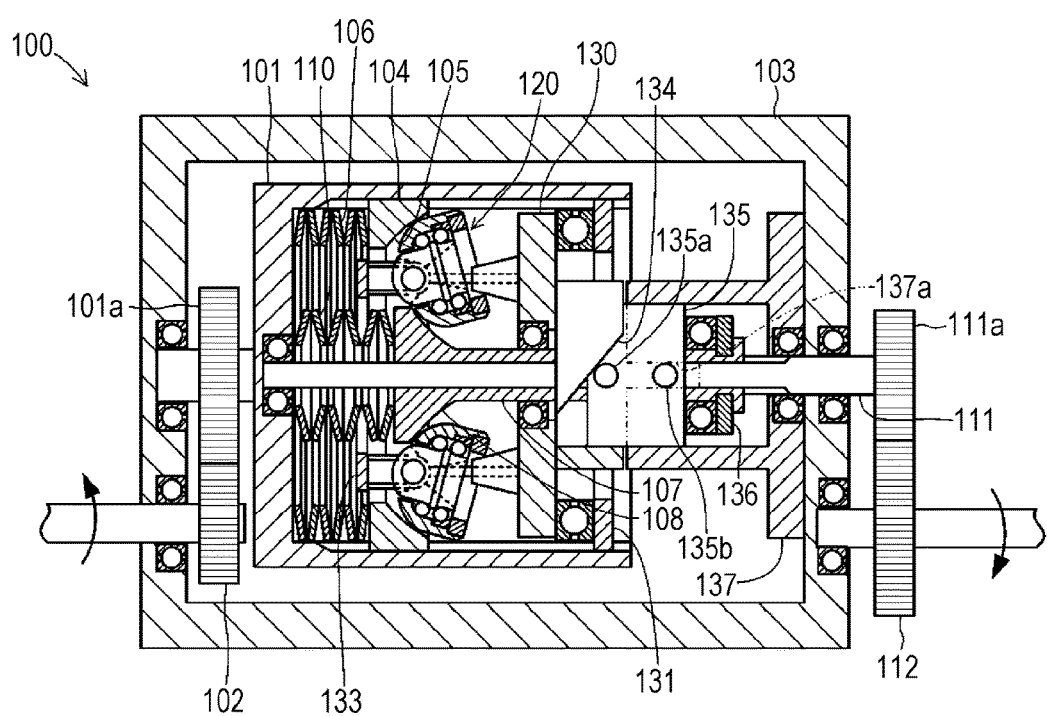
FIG. 6 is a cross-sectional view schematically illustrating the continuously variable transmission (in a LOW state) illustrated in FIG. 1.

The sub-base supporting pillars 132, which have a metallic plate-shaped body, are components to support the sub-support bases 133. These sub-base supporting pillars 132 extend from between the respective four cardioid intermediate transmission bodies 120 parallel to the cardioid intermediate transmission bodies 120. The sub-support bases 133 are components to support the four cardioid intermediate transmission bodies 120 from the slider 127b sides of the rotator supporting pillars 127. The sub-support base 133 is formed by processing a metal material into a ring-shaped flat plate. Accordingly, the four cardioid intermediate transmission bodies 120 are supported on both ends by supporting joists sandwiched between the rotator support bases 130 and the sub-support bases 133. FIG. 1 illustrates the sub-base supporting pillars 132 by the two-dot chain lines. FIGS. 5 and 6 omit the illustration of the sub-base supporting pillar 132.

Figure 8:
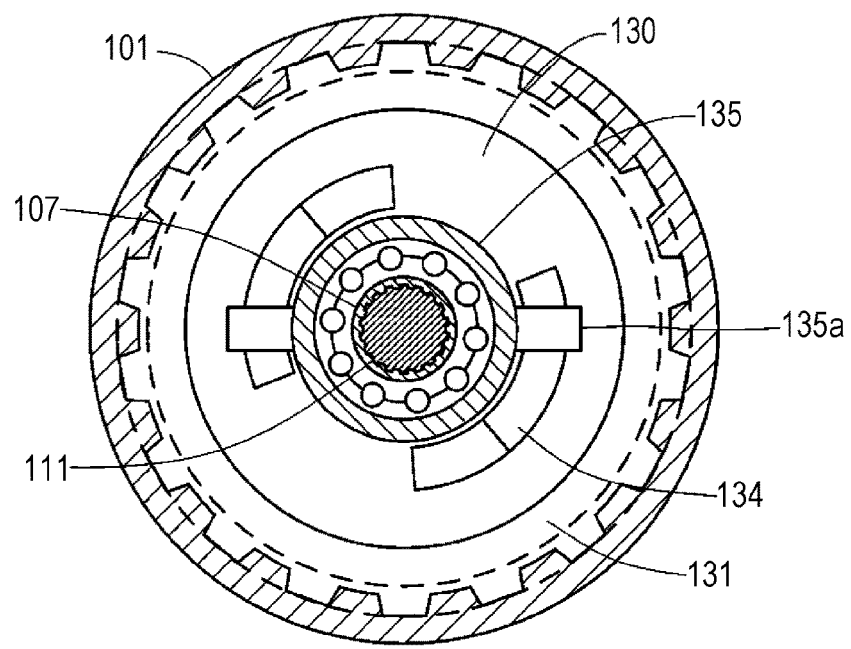
FIG. 8 is a cross-sectional view schematically illustrating an outline of an internal constitution of main parts in the continuously variable transmission viewed from line 8-8 indicated in FIG. 1.

Meanwhile, the rotator support base 130 includes a cam body 134 on a plate surface on a side opposite from the side where the cardioid intermediate transmission body 120 and the sub-support base 133 are disposed. The cam body 134 is a component to apply tensile force to pressing force by the inner press body 110. Thus, the cam body 134 and the inner press body 110 press the inner cycloid transmission body 107 to the cardioid intermediate transmission body 120 by a force stronger than the pressing force by the outer press body 106. The cam body 134 has an inclined surface gradually projecting out from the plate surface of the rotator support base 130 in a straight line. The cam body 134 is formed such that this inclined surface extends in an arc pattern (in other words, in a spiral pattern). As illustrated in FIG. 8, the rotator support base 130 includes the two cam bodies 134. The two cam bodies 134 are disposed point-symmetrically around a center of the rotator support base 130 on the plate surface. These two cam bodies 134 are fixedly secured to the plate surface of the rotator support base 130 to circumferentially swing integrally with the rotator support base 130. The inclined surface of the cam body 134 may extend in a straight line or may extend in a curved surface shape.

A pressing sleeve 135 is disposed inside the two cam bodies 134. The pressing sleeve 135 is a component to displace the inner cycloid transmission body 107 to the output gear 111a side collaborating with the cam bodies 134. The pressing sleeve 135 has a metallic tubular body. Driven pins 135a are disposed on the outer peripheral surface on the one (the left side in FIG. 5) end side of this pressing sleeve 135. Furthermore, rotation stopper pins 135b are disposed on the outer peripheral surface of the other (the right side in FIG. 5) end side of the pressing sleeve 135.

The driven pins 135a are round rod-shaped components that slide on the inclined surface of the cam bodies 134. The driven pins 135a are disposed at two positions on opposite sides from one another on the outer peripheral surface of the pressing sleeve 135. That is, the two driven pins 135a are formed to project to the opposite sides from one another at positions corresponding to the two inclined surfaces of the cam bodies 134. The rotation stopper pins 135b are round rod-shaped components that restrain a circumferential rotation of the pressing sleeve 135. The rotation stopper pins 135b are formed at two positions opposite from one another on the outer peripheral surface of the pressing sleeve 135 so as to extend to the opposite sides from one another.

The other (the right in FIG. 5) end side of the inner cycloid transmission body 107 slidably passes through the pressing sleeve 135 and is supported by the pressing sleeve 135. In this case, sleeve receivers 136 are disposed at the right-side end in FIG. 5 in the inner cycloid transmission body 107 via the bearings with the pressing sleeve 135. The sleeve receiver 136 projects out radially outside the inner cycloid transmission body 107. The sleeve receiver 136 is configured so as to ensure receiving the pressing sleeve 135 displaced to the sleeve receiver 136 side in a relatively rotatable state. The end of the pressing sleeve 135 on the rotation stopper pin 135b side is fitted to the inside of a hub flange 137.

The hub flange 137 is a metallic component that mainly restricts the rotation of the pressing sleeve 135 around the axial line. The hub flange 137 has a closed tubular bottom that covers the peripheral portion of the end of the pressing sleeve 135 on the sleeve receiver 136 side. In this case, the outer peripheral surface of the pressing sleeve 135 slidably contacts the inner peripheral surface of the hub flange 137. The inner peripheral surface of the hub flange 137 guides the displacement of the pressing sleeve 135 in the axis line direction back and forth. Groove-shaped cutouts 137a are formed along the axis line direction at some tubularly formed parts on the hub flange 137, more specifically, at positions corresponding to the respective two rotation stopper pins 135b.

The cutouts 137a are parts to restrain the rotation of the pressing sleeve 135. The cutouts 137a have a groove width such that the respective rotation stopper pins 135b are loose-fitted into the cutouts 137a. The rotation stopper pins 135b are slidable in the cutouts 137a. To illustrate the cutouts 137a, the drawing illustrates a part of the pressing sleeve 135 including the cutouts 137a by the two-dot chain line. The hub flange 137 rotatably supports the output shaft 111 via the bearings. This hub flange 137 is securely mounted to the casing 103.

As illustrated in FIG. 9, the continuously variable transmission 100 thus configured is disposed between the engine 80 and the clutch 81. The continuously variable transmission 100 transmits the rotary driving power from the engine 80 to the clutch 81 while changing the rotary driving power. In this case, the clutch 81 is a mechanical device that transmits the rotary driving power from the crankshaft to the driving wheel 90 side while connecting and disconnecting a rotation drive shaft of the engine 80. As the clutch 81, a centrifugal clutch, a multiplate clutch, and the like can be used. A general motorcycle usually includes a primary reduction gear 82 and a secondary reduction gear 83 between the clutch 81 and the driving wheel 90.

(Actuation of Continuously Variable Transmission 100)

The following describes the actuation of the continuously variable transmission 100 configured as described above. As described above, this continuously variable transmission 100 is disposed below the sitting seat or the fuel tank in the two-wheeled vehicle (may be simply referred to as a "vehicle"). The continuously variable transmission 100 automatically changes the gear ratio while the vehicle is traveling or temporarily stops in a runnable state (an idling state).

First, with the vehicle stopped, as illustrated in FIG. 5, the continuously variable transmission 100 enters a TOP state.

Here, the continuously variable transmission 100 in the TOP state means a state (a high gear state) in which the gear ratio of the continuously variable transmission 100 is the highest (the value of the gear ratio is the smallest). This state is formed when the outer cycloid transmission body 104, which serves as the input side member, does not generate a torque difference (includes an exceedingly small torque difference) with the inner cycloid transmission body 107, which serves as the output side member. Specifically, the high gear state is formed when the clutch 81 is in a clutch OFF state (when the transmission of the rotary driving power is cut off) and when the vehicle travels at a high speed.

When there is no torque difference between the outer cycloid transmission body 104 and the inner cycloid transmission body 107, in the continuously variable transmission 100, the rotary driving power from the engine 80 rotatably drives the outer cycloid transmission body 104 via a rotary drive of the outer transmission body holder 101. Accordingly, in the continuously variable transmission 100, the cardioid rotors 121 of the cardioid intermediate transmission bodies 120, which contact the outer cycloid curved surface 105 of the outer cycloid transmission body 104, rotatably drive. In association with this, the inner cycloid transmission body 107, which contacts the cardioid curved surfaces 122 in the cardioid rotors 121, rotatably drives. In this case, since the output shaft 111 is fitted to the inner cycloid transmission body 107 with the splines, the output shaft 111 rotatably drives integrally with the inner cycloid transmission body 107.

Meanwhile, since the rotator support base 130 and the pressing sleeve 135 are supported to the inner cycloid transmission body 107 to slidably rotate, the rotator support base 130 and the pressing sleeve 135 do not perform the rotary drive. In this case, the cardioid rotors 121 in the cardioid intermediate transmission bodies 120 simultaneously receive the pressing force from the outer press body 106 through the outer cycloid transmission body 104 and the pressing force from the inner press body 110 through the inner cycloid transmission body 107. In this case, the pressing force from the outer press body 106 is larger than the pressing force from the inner press body 110. In view of this, with the continuously variable transmission 100, the cardioid rotor 121 is inclined to the outer cycloid transmission body 104 side around the sliding pin 128. In view of this, the cardioid rotor 121 presses back the inner cycloid transmission body 107 against the pressing force from the inner press body 110. This sets the continuously variable transmission 100 in the TOP state. That is, the cardioid rotor 121 is inclined centering the starting point of the cardioid curve Ca, which forms the cardioid curved surface 122.

In this TOP state, the continuously variable transmission 100 changes the rotary driving power at the gear ratio according to a position where the outer cycloid curved surface 105 of the outer cycloid transmission body 104 contacts the cardioid curved surface 122 of the cardioid rotor 121 and a position where the inner cycloid curved surface 108 of the inner cycloid transmission body 107 contacts the cardioid curved surface 122 of the cardioid rotor 121.

Figure 10:
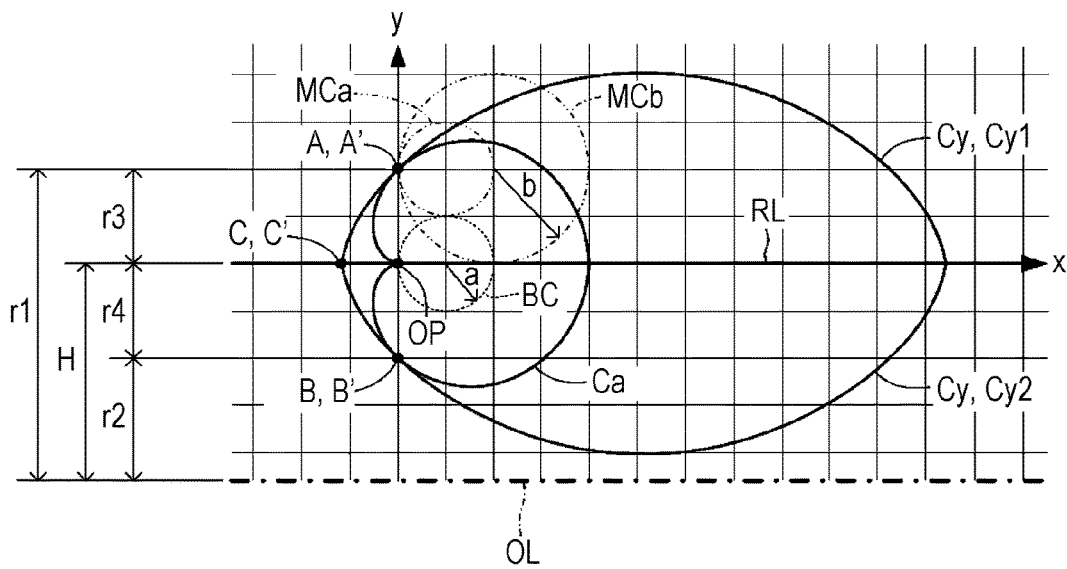
FIG. 10 is an explanatory view for describing a relationship between a cardioid curved surface and an outer cycloid curved surface and an inner cycloid curved surface in the case where the continuously variable transmission illustrated in FIG. 1 is in an MID state (or an initial state)
Figure 11:
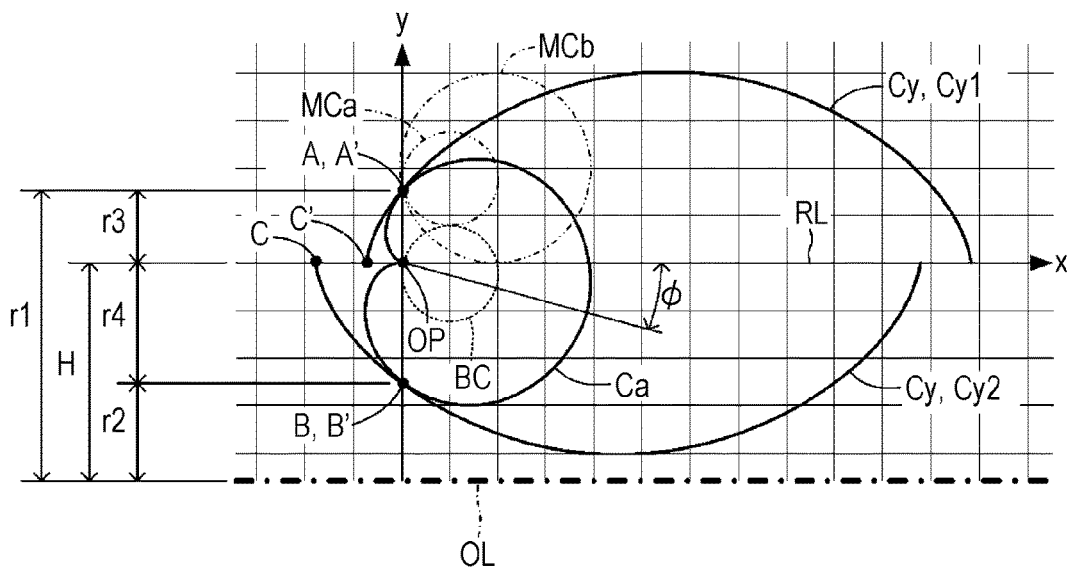
FIG. 11 is an explanatory view for describing a relationship between the cardioid curved surface and the outer cycloid curved surface and the inner cycloid curved surface in the case where the continuously variable transmission illustrated in FIG. 1 is in the TOP state (an actuating state)

That is, the gear ratio in the continuously variable transmission 100 can be expressed using the distance H, a distance r1, a distance r2, a distance r3, and a distance r4 shown in FIGS. 10 and 11. The distance H is a distance between a rotational center axis OL of the output shaft 111 and an inclined center point OP of the cardioid rotor 121. The distance r1 is a distance between a contact point A (A') of the cardioid curved surface 122 with the outer cycloid curved surface 105 and the rotational center axis OL of the output shaft 111. The distance r2 is a distance between a contact point B (B') of the cardioid curved surface 122 with the inner cycloid curved surface 108 and the rotational center axis OL of the output shaft 111. The distance r3 is a distance between the contact point A (A') and the inclined center point OP. The distance r4 is a distance between the contact point B (B') and the inclined center point OP. Respective gear ratio η (r3r1) and gear ratio η (r2r4) of the continuously variable transmission 100 are expressed by the following Expression 1 and Expression 2. Accordingly, a total gear ratio can be found as the following Expression 3.

$$\eta(r3r1)=r3/r1 \quad \text{(Expression 1)}$$

$$\eta(r2r4)=r2/r4 \quad \text{(Expression 2)}$$

$$\text{Total gear ratio}=(r3/r4)\times(r2/r1) \quad \text{(Expression 3)}$$

Furthermore, the distances r1 to r4 can be expressed by the following Expressions 4 to 7. a in these expressions denotes the moving circle radius a of the moving circle MCa, which is a circle having a diameter identical to the fixed circle BC for the cardioid curve Ca constituting the cardioid curved surface 122. Furthermore, φ denotes an inclined angle φ (−: clockwise, +: counterclockwise) of the cardioid rotor 121 with respect to a rotator parallel axis RL, which passes through the inclined center point OP and is parallel to the rotational center axis OL.

$$r1=H+r3 \quad \text{(Expression 4)}$$

$$r2=H-r4 \quad \text{(Expression 5)}$$

$$r3=2\times a\times(\sin \phi+1) \quad \text{(Expression 6)}$$

$$r4=-2\times a\times(\sin \phi-1) \quad \text{(Expression 7)}$$

Multiplying Expression 3 by a rotation speed Ne of the engine 80 allows a confirmation that the gear ratio in the TOP state becomes higher than the gear ratio in a LOW state, which will be described later (the value of the gear ratio decreases). That is, the continuously variable transmission 100 causes the output shaft 111 to rotatably drive at a high rotation and a low torque using the rotary driving power from the engine 80 in the TOP state.

In the case where the vehicle starts moving with the continuously variable transmission 100 in such TOP state, the continuously variable transmission 100 instantaneously transitions to the LOW state (see FIG. 6). Specifically, in the continuously variable transmission 100, when the clutch 81 enters a clutch ON state where the rotary driving power is transmitted, a load from the driving wheel 90 is applied to the inner cycloid transmission body 107 via the output shaft 111. Therefore, a torque difference occurs between the inner cycloid transmission body 107 and the outer cycloid transmission body 104. This generates the load against the rotary drive from the inner cycloid transmission body 107 to the cardioid rotor 121 in the continuously variable transmission 100. In view of this, the force corresponding to this load acts on the rotator support base 130. Consequently, this rotator support base 130 starts rotating with the inner cycloid transmission body 107 as its rotational center. The torque difference in this case is generated by the load on the inner cycloid transmission body 107, which serves as the output side member, attempting to avoid the rotary drive on the outer cycloid transmission body 104, which serves as the input side member.

In this case, the cam bodies 134, which are disposed on the rotator support base 130, press the driven pins 135a on the pressing sleeve 135 toward the hub flange 137 side (the right side in FIG. 5). This causes the pressing sleeve 135 to press the inner cycloid transmission body 107, displacing the inner cycloid transmission body 107 to the hub flange 137 side. Accordingly, the inner cycloid transmission body 107 is displaced to the hub flange 137 side by tensile force by the cam bodies 134 added to the pressing force from the inner press body 110 while resisting the pressing force from the outer press body 106. This inclines the cardioid rotor 121 toward the inner cycloid transmission body 107 side.

That is, in the continuously variable transmission 100, when the torque of the outer cycloid transmission body 104, which serves as the input side member, exceeds the torque of the inner cycloid transmission body 107, which serves as the output side member, the inner cycloid transmission body 107 is displaced to the hub flange 137 side. This inclines the cardioid rotor 121 to the inner cycloid transmission body 107 side. Furthermore, the outer cycloid transmission body 104 is pressed by the inclined cardioid rotor 121 and pressed back to the outer press body 106 side. This sets the continuously variable transmission 100 to the LOW state (see FIG. 6) where the cardioid rotor 121 is inclined to the inner cycloid transmission body 107 side through the MID state illustrated in FIG. 1. In this case, the continuously variable transmission 100 changes the rotary driving power at the gear ratio according to the position where the cardioid curved surface 122 of the cardioid rotor 121 contacts the outer cycloid curved surface 105 of the outer cycloid transmission body 104 and the position where the cardioid curved surface 122 of the cardioid rotor 121 contacts the inner cycloid curved surface 108 of the inner cycloid transmission body 107.

Specifically, the continuously variable transmission 100 has the gear ratio shown by Expression 3 in a process of displacement of the inner cycloid transmission body 107 and the outer cycloid transmission body 104. In this case, multiplying Expression 3 by the rotation speed Ne of the engine 80 allows a confirmation that the gear ratio in the LOW state becomes lower than the gear ratio in the TOP state (the value of the gear ratio increases). That is, the continuously variable transmission 100 causes the output shaft 111 to rotatably drive at a low rotation and a high torque using the rotary driving power from the engine 80.

In the process of inclining these cardioid rotors 121, the cardioid rotors 121 roll on the outer cycloid curved surface 105 and the inner cycloid curved surface 108. In this respect, a sliding friction and a slip do not occur in the inclining direction between the cardioid curved surface 122 of the cardioid rotor 121 and the outer cycloid curved surface 105 of the outer cycloid transmission body 104; and between the cardioid curved surface 122 and the inner cycloid curved surface 108 of the inner cycloid transmission body 107. The reason is that the outer cycloid curved surface 105 and the inner cycloid curved surface 108 are constituted of the cycloid curve Cy. The moving circle radius b of the cycloid curve Cy is twice as large as the moving circle radius a of the cardioid curve Ca, which constitutes the cardioid curved surface 122.

Here, meeting the following two Conditions 1 and 2 ensures a rolling contact of the cardioid curved surfaces 122 on the outer cycloid curved surface 105 and the inner cycloid curved surface 108 without the slip. Condition 1 is: a roll length of the cardioid curved surface 122 on the outer cycloid curved surface 105 is mutually equal to a roll length of the cardioid curved surface 122 on the inner cycloid curved surface 108. Condition 2 is: in the process of rolling, the cardioid curved surfaces 122 contact the outer cycloid curved surface 105 at the identical contact point, and the cardioid curved surfaces 122 contact the inner cycloid curved surface 108 at the identical contact point.

First, the following describes Condition 1. Suppose that the moving circle MCa of the cardioid curve Ca rotates on the fixed circle BC, which has the radius identical to the moving circle radius a, at a rotation angle from 0° to θ°. In this case, a length LCa of the cardioid curve Ca is as the following Expression 8. Suppose that the moving circle MCb of the cycloid curve Cy rotates at a rotation angle from 0° to t°. In this case, a length LCy of the cycloid curve Cy is as the following Expression 9.

$LCa=8 \times a \times (1-\cos(\theta/2))$ (Expression 8)

$LCy=4 \times b \times (1-\cos(t/2))$ (Expression 9)

Accordingly, configuring the moving circle radius b of the cycloid curve Cy twice as large as the moving circle radius a in the cardioid curve Ca makes the roll length of the cardioid rotor 121 on the outer cycloid transmission body 104 and the roll length of the cardioid rotor 121 on the inner cycloid transmission body 107 identical (LCa=LCy). In other words, this means that the cardioid curve Ca can keep contacting the cycloid curve Cy also in the case where the heart-shaped cardioid curve Ca rolls while the starting point (a cusp (OP)) of the cardioid curve Ca moves on the fixed straight line BL (see FIG. 4) of the cycloid curve Cy.

The following describes Condition 2. As illustrated in FIG. 10, in the initial state (φ=0) before the cardioid curve Ca, which constitutes the cardioid curved surface 122, rolls on the respective cycloid curves Cy, which constitute the outer cycloid curved surface 105 and the inner cycloid curved surface 108, a curve equation and a differential equation for a cycloid curve Cy1, which constitutes the outer cycloid curved surface 105, is as shown in the following Expressions 10 and 11.

$x=2 \times a \times (t-\sin t)-a \times (\pi-2)$ $y=2 \times a \times (1-\cos t)$ $0° \le t \le 360°$ (Expression 10)

$dy/dx=\cot(t/2)$ (Expression 11)

Assigning t=π/2 to the respective Expressions 10 and 11 yields a coordinate for the contact point A of the cardioid curved surface 122 on the outer cycloid curved surface 105 to (0, 2a) and a differential value of the contact point A to dy/dx=1.

In the initial state, the curve equation and differential equation for the cardioid curve Ca are as shown in the following Expressions 12 and 13.

$x=a \times (1+\cos 2\theta-2 \cos \theta)$ $y=a \times (2 \sin \theta-\sin 2\theta)$ $-360° \le \theta \le 360°$ (Expression 12)

$dy/dx=(\cos \theta-\cos 2\theta)/(\sin \theta-\sin 2\theta)$ (Expression 13)

Assigning θ=π/2 to the respective Expressions 12 and 13 yields a coordinate for the contact point A' of the outer cycloid curved surface 105 on the cardioid curved surface 122 to (0, 2a) and a differential value of the contact point A' to dy/dx=1. That is, the cardioid curved surfaces 122 contact the outer cycloid curved surface 105 at the identical contact point.

Furthermore, in the initial state, the curve equation and the differential equation for a cycloid curve Cy2, which constitutes the inner cycloid curved surface 108, is as shown in the following Expressions 14 and 15.

$x=2 \times a \times (t-\sin t)-a \times (\pi-2)$ $y=-2 \times a \times (1-\cos t)$ $0° \le \theta \le 360°$ (Expression 14)

$dy/dx=-\cot(t/2)$ (Expression 15)

Assigning θ=−π/2 to the respective Expressions 12 and 13 yields a coordinate for the contact point B' of the inner cycloid curved surface 108 on the cardioid curved surface 122 to (0, −2a) and a differential value of the contact point B' to dy/dx=−1. Assigning t=π/2 to the respective Expressions 14 and 15 yields a coordinate for the contact point B of the cardioid curved surface 122 on the inner cycloid curved surface 108 to (0, −2a) and a differential value of the contact point B to dy/dx=−1. That is, the cardioid curved surfaces 122 contact the inner cycloid curved surface 108 at the identical contact point.

Next, as illustrated in FIG. 11, in the actuating state (π≠0) when the cardioid curve Ca, which constitutes the cardioid curved surface 122, rolls on the respective cycloid curves Cy, which constitute the outer cycloid curved surface 105 and the inner cycloid curved surface 108, a curve equation for the cycloid curve Cy1, which constitutes the outer cycloid curved surface 105, is as shown in the following Expressions 16.

$x=2 \times a \times (t-\sin t)-2 \times a \times (\pi/2+\phi-\cos \phi)$ $y=2 \times a \times (1-\cos t)$ (Expression 16)

Assigning t=π/2+φ to the respective Expressions 16 and 11 yields a coordinate for the contact point A of the cardioid curved surface 122 on the outer cycloid curved surface 105 to (0, 2a×(1+sin φ)) and a differential value of the contact point A to dy/dx=cot(π/4+φ/2).

In the actuating state, the curve equation of the cardioid curve Ca is as shown in the following Expression 17.

$x=\cos \phi \times a \times (1+\cos 2\theta-2 \cos \theta)-\sin \phi \times a \times (2 \sin \theta-\sin 2\theta)$ $y=\sin \phi \times a \times (1+\cos 2\theta-2 \cos \theta)+\cos \phi \times a \times (2 \sin \theta-\sin 2\theta)$ (Expression 17)

Assigning θ=t=π/2+φ to the respective Expressions 17 and 13 yields a coordinate for the contact point A' of the outer cycloid curved surface 105 on the cardioid curved surface 122 to (0, 2a× (1+sin φ)) and a differential value of the contact point A' to dy/dx=cos φ/(1+sin φ)=cot(π/4+φ/2). That is, the cardioid curved surfaces 122 contact the outer cycloid curved surface 105 at the identical contact point.

Furthermore, in the actuating state, a curve equation of the cycloid curve Cy2, which constitutes the inner cycloid curved surface 108, is as shown in the following Expression 18.

$x=2 \times a \times (t-\sin t)-2 \times a \times (\pi/2-\phi-\cos \phi)$ $y=-2 \times a \times (1-\cos t)$ (Expression 18)

Assigning θ=π/2 to the respective Expressions 17 and 13 yields a coordinate for the contact point B' of the inner cycloid curved surface 108 on the cardioid curved surface 122 to (0, 2a× (sin φ−1)) and a differential value of the contact point B' to dy/dx=cos φ/(sin φ−1). Assigning t=π/2−φ to the respective Expressions 18 and 15 yields a coordinate for the contact point B of the cardioid curved surface 122 on the inner cycloid curved surface 108 to (0, 2a×(sin φ−1)) and a differential value of the contact point B to dy/dx=−cot(π/4−φ/2)=cos φ/(sin φ−1). That is, the cardioid curved surfaces 122 contact the inner cycloid curved surface 108 at the identical contact point. Thus, the outer cycloid curved surface 105 has the contact point with respect to the cardioid curved surfaces 122 in common, and the inner cycloid curved surface 108 has the contact point with respect to the cardioid curved surfaces 122 in common.

When the vehicle starts moving, the continuously variable transmission 100 in the TOP state instantaneously transitions to the LOW state. Afterwards, the continuously variable transmission 100 transitions to the TOP state in accordance with a smaller torque difference between the inner cycloid transmission body 107 and the outer cycloid transmission body 104 as the speed of the vehicle increases. Specifically, the increase in the rotation speed of the driving wheel 90 reduces the torque difference between the inner cycloid transmission body 107 and the outer cycloid transmission body 104. In view of this, in the continuously variable transmission 100, resistive power from the inner cycloid transmission body 107 against the rotary drive of the cardioid rotor 121 reduces, reducing power of rotating the rotator support base 130 to the driven pin 135a side.

Accordingly, the continuously variable transmission 100 reduces the pressing force of pressing the inner cycloid transmission body 107 to the hub flange 137 side against the pressing force by the outer press body 106. In view of this, the outer cycloid transmission body 104 is pressed to the cardioid rotor 121 side, and the inner cycloid transmission body 107 is pressed back to the inner press body 110 side. That is, in the continuously variable transmission 100, the cardioid rotors 121 are inclined to the outer cycloid transmission body 104 side around the sliding pins 128. In view of this, the cardioid rotors 121 press back the inner cycloid transmission body 107 against the pressing force from the inner press body 110. This sets the continuously variable transmission 100 to the TOP state (see FIG. 5) through the MID state (see FIG. 1).

The gear ratio of the continuously variable transmission 100 in the process of transition from this LOW state to the TOP state becomes a gear ratio according to the position where the outer cycloid curved surface 105 of the outer cycloid transmission body 104 contacts the cardioid curved surface 122 of the cardioid rotor 121 and a position where the inner cycloid curved surface 108 of the inner cycloid transmission body 107 contacts the cardioid curved surface 122 of the cardioid rotor 121, namely, the gear ratio shown by Expression 3.

Meanwhile, at a deceleration of the travelling vehicle, the continuously variable transmission 100 generates a so-called back torque, which is a power attempting to rotatably drive the outer cycloid transmission body 104 from the inner cycloid transmission body 107 to the outer cycloid transmission body 104. In this case, the inner cycloid transmission body 107 is not displaced to the hub flange 137 side, maintaining the TOP state of the continuously variable transmission 100.

When the vehicle accelerates again after the deceleration, as described above, the gear ratio of the continuously variable transmission 100 instantaneously transitions to the LOW state side. Specifically, similar to the above-described case, in the continuously variable transmission 100, the inner cycloid transmission body 107 is displaced to the hub flange 137 side according to the torque difference between the inner cycloid transmission body 107 and the outer cycloid transmission body 104. Furthermore, the outer cycloid transmission body 104 retreats to the outer press body 106 side, inclining the cardioid rotors 121. This lowers the gear ratio of the continuously variable transmission 100 (the value of the gear ratio increases). That is, the continuously variable transmission 100 enters the MID state (see FIG. 1) or a state close to the MID state. Then, as described above, the continuously variable transmission 100 transitions to the TOP state again according to the acceleration of the vehicle.

Meanwhile, with the vehicle stopped, the continuously variable transmission 100 maintains the TOP state. In the case where the vehicle starts moving, as described above, the continuously variable transmission 100 instantaneously transitions to the LOW state and then transitions to the TOP state according to the increase in the vehicle speed.

As apparent from the actuation explanation, according to the first embodiment, the continuously variable transmission 100 includes the cardioid intermediate transmission bodies 120, which have the cardioid curved surfaces 122 constituted of the cardioid curves Ca, between the outer cycloid curved surface 105 and the inner cycloid curved surface 108, which are both constituted of the cycloid curves Cy. Inclination of the cardioid intermediate transmission bodies 120 to the outer cycloid transmission body 104 side or the inner cycloid transmission body 107 side changes the rolling contact point. This transmits the rotary driving power from the outer cycloid transmission body 104, which serves as the input side member, to the inner cycloid transmission body 107, which serves as the output side member, while the rotation speed ratio is continuously changed.

In this case, in the continuously variable transmission 100, the outer cycloid curved surface 105 and the inner cycloid curved surface 108 are constituted of the cycloid curves Cy. The moving circle radius b of the cycloid curve Cy is twice as large as the moving circle radius a of the cardioid curve Ca constituting the cardioid curved surface 122. This allows the cardioid curved surface 122 to roll on and contact the outer cycloid curved surface 105 and the inner cycloid curved surface 108 without the friction resistance and the slip. Accordingly, with the continuously variable transmission 100 according to the embodiment, when the cardioid intermediate transmission bodies 120 are inclined to the outer cycloid transmission body 104 side or the inner cycloid transmission body 107 side for gear shift, the transmission loss of the driving power due to the friction resistance or the slip is less likely to occur. This ensures improving the transmission efficiency of the driving power.

Second Embodiment

Figure 12:
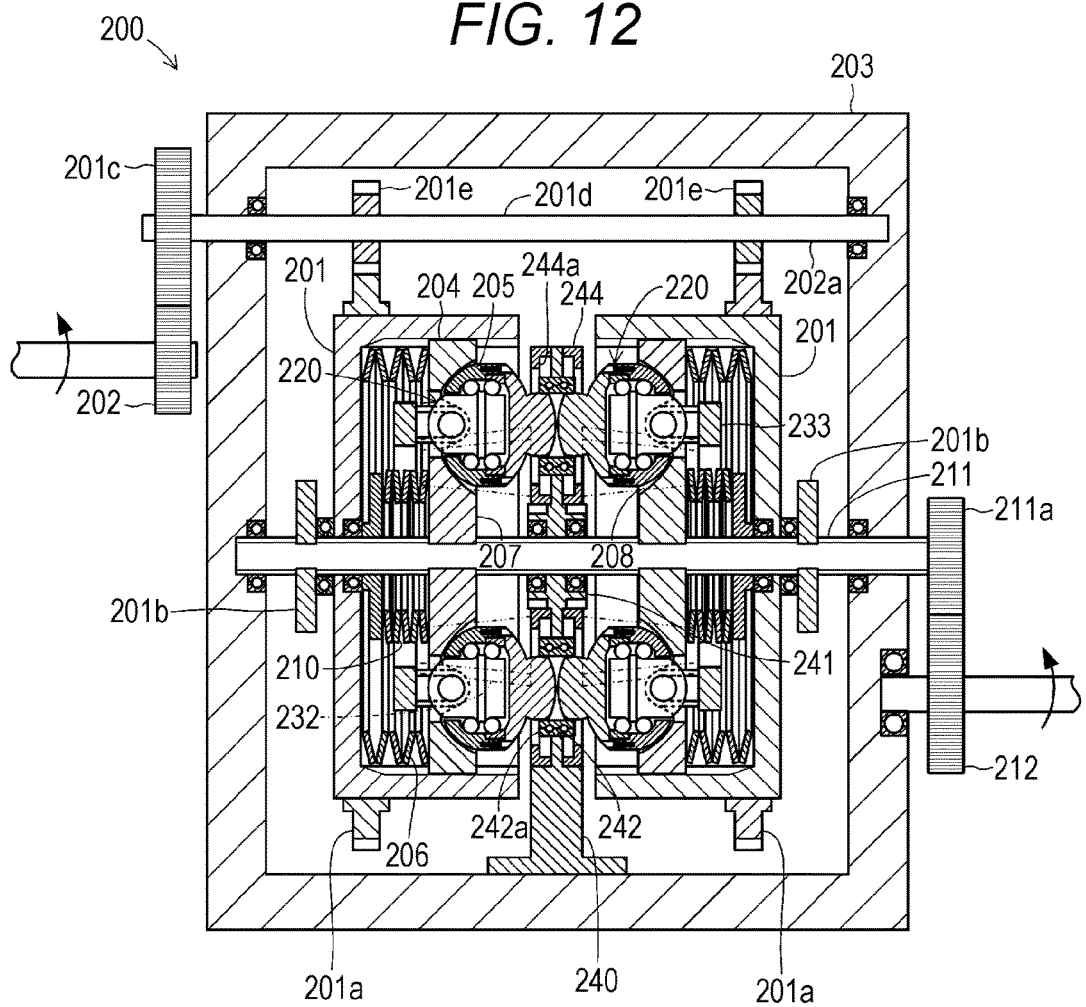
FIG. 12 is a cross-sectional view schematically illustrating an outline of an entire configuration of a continuously variable transmission (in the MID state) according to a second embodiment of the present disclosure.

The following describes the second embodiment, which is one embodiment of the continuously variable transmission according to the present disclosure, with reference to the drawings. The distinctive part of a continuously variable transmission 200 of this second embodiment, which is the most different part from the continuously variable transmission 100 of the first embodiment, is as follows. That is, as illustrated in FIG. 12, the continuously variable transmission 200 includes striking curved surfaces 225b at respective two cardioid intermediate transmission bodies 220 opposed to one another. Furthermore, the two cardioid intermediate transmission bodies 220 are disposed with these striking curved surfaces 225b striking on one another. Therefore, this second embodiment mainly describes the points of the continuously variable transmission 200 different from the continuously variable transmission 100 according to the first embodiment, and the following appropriately omits descriptions on the points common to and corresponding to both embodiments.

FIG. 12 is a cross-sectional view schematically illustrating an outline of an entire configuration of the continuously variable transmission 200 according to the embodiment. Similar to the continuously variable transmission 100, this continuously variable transmission 200 is a mechanical device that transmits the rotary driving power generated by the engine 80, which is the power engine for two-wheeled vehicles (so-called motorcycles) to the driving wheel 90, which is the rear wheel of the two-wheeled vehicle, while continuously changing the gear ratio (see FIG. 9). The continuously variable transmission 200 is disposed around the engine 80 (for example, below the sitting seat or the fuel tank) in the two-wheeled vehicle.

(Configuration of Continuously Variable Transmission 200)

As illustrated in FIG. 12, the continuously variable transmission 200 includes two outer transmission body holders 201 similar to the outer transmission body holder 101. These two outer transmission body holders 201 are rotatably supported on an output shaft 211 in a direction of opposing openings to one another. In this case, an axial displacement of the respective outer transmission body holders 201 is restricted by stoppers 201b, which are disposed on the output shaft 211 via bearings.

On outer peripheral surfaces of these two outer transmission body holders 201, input gears 201a circumferentially project out. The input gears 201a mesh with relay gears 201e, which are disposed on a relay shaft 201d extending from a relay input gear 201c. The input gear 201a and the relay gear 201e rotatably drive integrally by the rotary driving power from the engine 80. The relay input gear 201c meshes with a pre-deceleration gear 202, which transmits the rotary driving power from the engine 80 with reduced rotation speed, for rotary drive. The relay shaft 201d is supported to a casing 203, which is formed into a box shape similar to the casing 103, with the relay input gear 201c externally exposed so as to rotatably drive.

Outer cycloid transmission bodies 204, which are similar to the outer cycloid transmission body 104, are disposed at respective inner peripheral surfaces of the two outer transmission body holders 201. The outer cycloid transmission body 204 is held by spline fitting with a state where the outer cycloid transmission body 204 is displaceable along an axis line direction of the outer transmission body holder 201 and is integrally rotatable with the outer transmission body holder 201. In respective inner peripheral surfaces of the two outer cycloid transmission bodies 204, outer cycloid curved surfaces 205 similar to the outer cycloid curved surface 105 are formed.

These two outer cycloid transmission bodies 204 are fitted to the inner peripheral surfaces of the respective outer transmission body holders 201 with splines while being pressed by outer press bodies 206, which are disposed at inner bottoms of the respective outer transmission body holders 201. The outer cycloid transmission bodies 204 each rotatably drive concentrically with the outer transmission body holders 201. That is, these two outer cycloid transmission bodies 204 are equivalent to an example of the input side member in the continuously variable transmission 200 according to the present disclosure, which receives the rotary driving power from the engine 80 and rotatably drives. Similar to the outer press body 106, the outer press bodies 206 each have a plurality of disc springs formed into a ring shape. These outer press bodies 206 each constantly press the outer cycloid transmission bodies 204 to the cardioid intermediate transmission bodies 220 at a force stronger than a force by inner press bodies 210.

These two outer cycloid transmission bodies 204 internally include inner cycloid transmission bodies 207. Similar to the inner cycloid transmission bodies 107, the respective inner cycloid transmission bodies 207 are components to change the gear ratio of the continuously variable transmission 200 collaborating with the outer cycloid transmission bodies 204. The inner cycloid transmission body 207 is formed by processing a metal material into a ring-shaped flat plate. Inner cycloid curved surfaces 208, which are similar to the inner cycloid curved surface 108, are formed on outer peripheral surfaces of these two inner cycloid transmission bodies 207.

These two inner cycloid transmission body 207 are supported on the output shaft 211 while being pressed by the inner press bodies 210, which are disposed at the inner bottoms of the respective outer transmission body holders 201. In this respect, the respective inner cycloid curved surfaces 208 are disposed at positions opposed to the outer cycloid curved surfaces 205 of the outer cycloid transmission bodies 204. Similar to the inner press body 110, the inner press bodies 210 each have a plurality of disc springs formed into a ring shape. The inner press bodies 210 each constantly press the inner cycloid transmission bodies 207 to the cardioid intermediate transmission bodies 220 at a force weaker than a force by the outer press bodies 206.

Similar to the output shaft 111, the output shaft 211 is a component to output the rotary driving power changed by this continuously variable transmission 200 to the outside. The inner press bodies 210 each include an axially-extending steel material. On the outer peripheral surface of this output shaft 211, splines are formed along the axis direction. The outer peripheral surface of the output shaft 211 is fitted to the inner peripheral portions of the two inner cycloid transmission bodies 207 with the splines. Accordingly, the respective inner cycloid transmission bodies 207 are displaceable with respect to the output shaft 211 along the axis line direction of the output shaft 211 and supported by the output shaft 211 with a state rotatable integrally with the output shaft 211. That is, these two inner cycloid transmission bodies 207 are equivalent to an example of the output side member according to the present disclosure, which outputs the rotary driving power from the engine 80 changed by the continuously variable transmission 200 to the outside.

The one (the left side in FIG. 12) end of this output shaft 211 is rotatably supported to the center of the sidewall of the casing 203. Furthermore, the other (the right side in FIG. 12) end side of the output shaft 211 passes through the casing 203 to be rotatably supported by the casing 203. An output gear 211a similar to the output gear 111a is disposed at the other (the right side in FIG. 12) end of the output shaft 211. A post-deceleration gear 212 similar to the post-deceleration gear 112 meshes with the output gear 211a.

Figure 13:
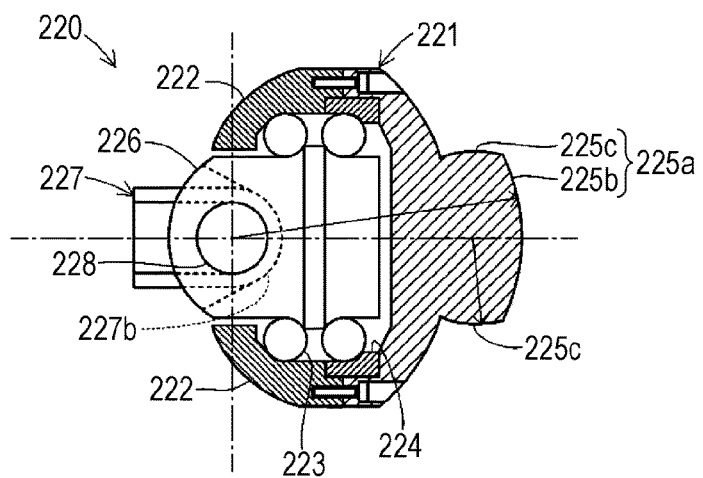
FIG. 13 is a cross-sectional side view illustrating an outline of an entire configuration of a cardioid rotor in a cardioid intermediate transmission body illustrated in FIG. 12.

The cardioid intermediate transmission bodies 220 are disposed between the respective outer cycloid transmission bodies 204 and inner cycloid transmission bodies 207. The cardioid intermediate transmission body 220 is a component that collaborates with both the outer cycloid transmission body 204 and the inner cycloid transmission body 207 to change the gear ratio of the continuously variable transmission 200. As illustrated in FIG. 13, the cardioid intermediate transmission body 220 mainly includes a cardioid rotor 221, an inclined sleeve 226, a rotator supporting pillar 227, and a sliding pin 228.

Figure 14:
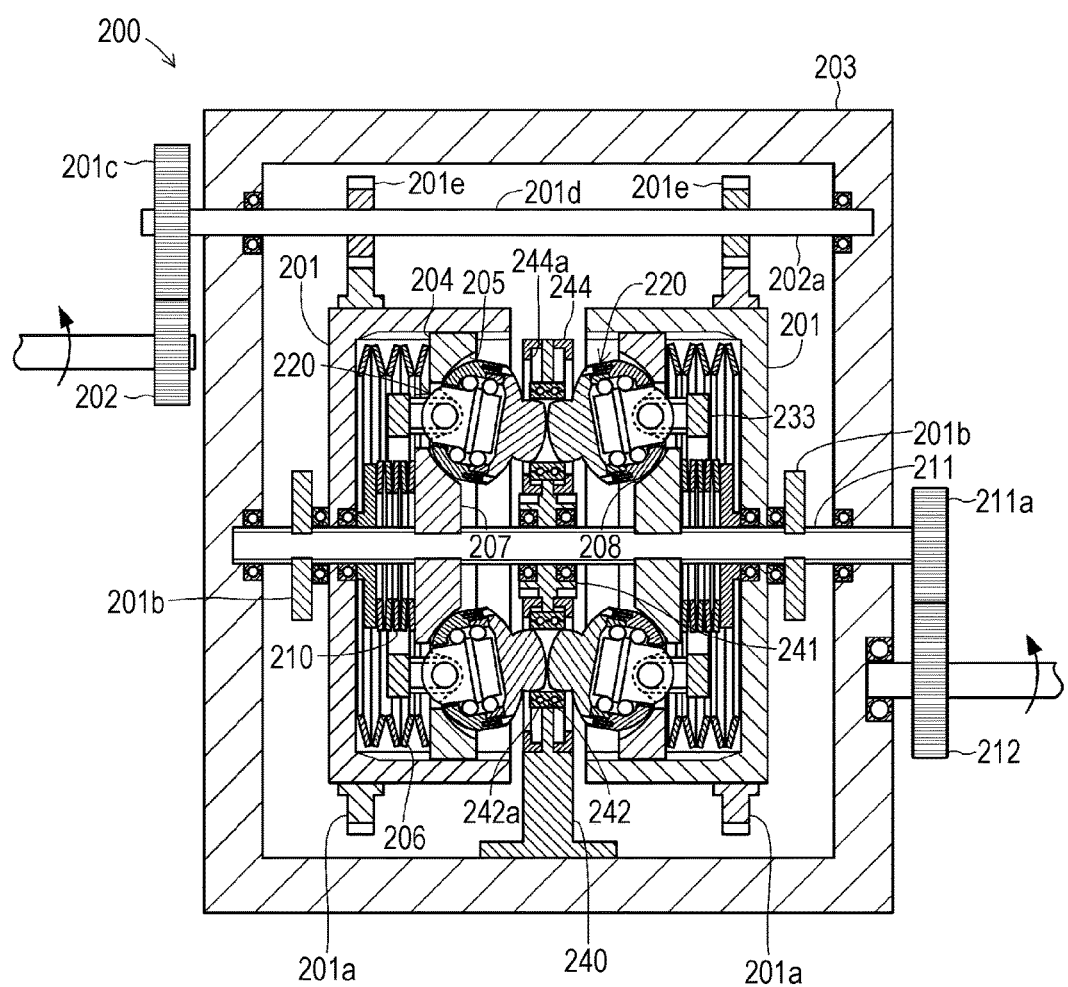
FIG. 14 is a cross-sectional view schematically illustrating the continuously variable transmission (in the TOP state) illustrated in FIG. 12.
Figure 15:
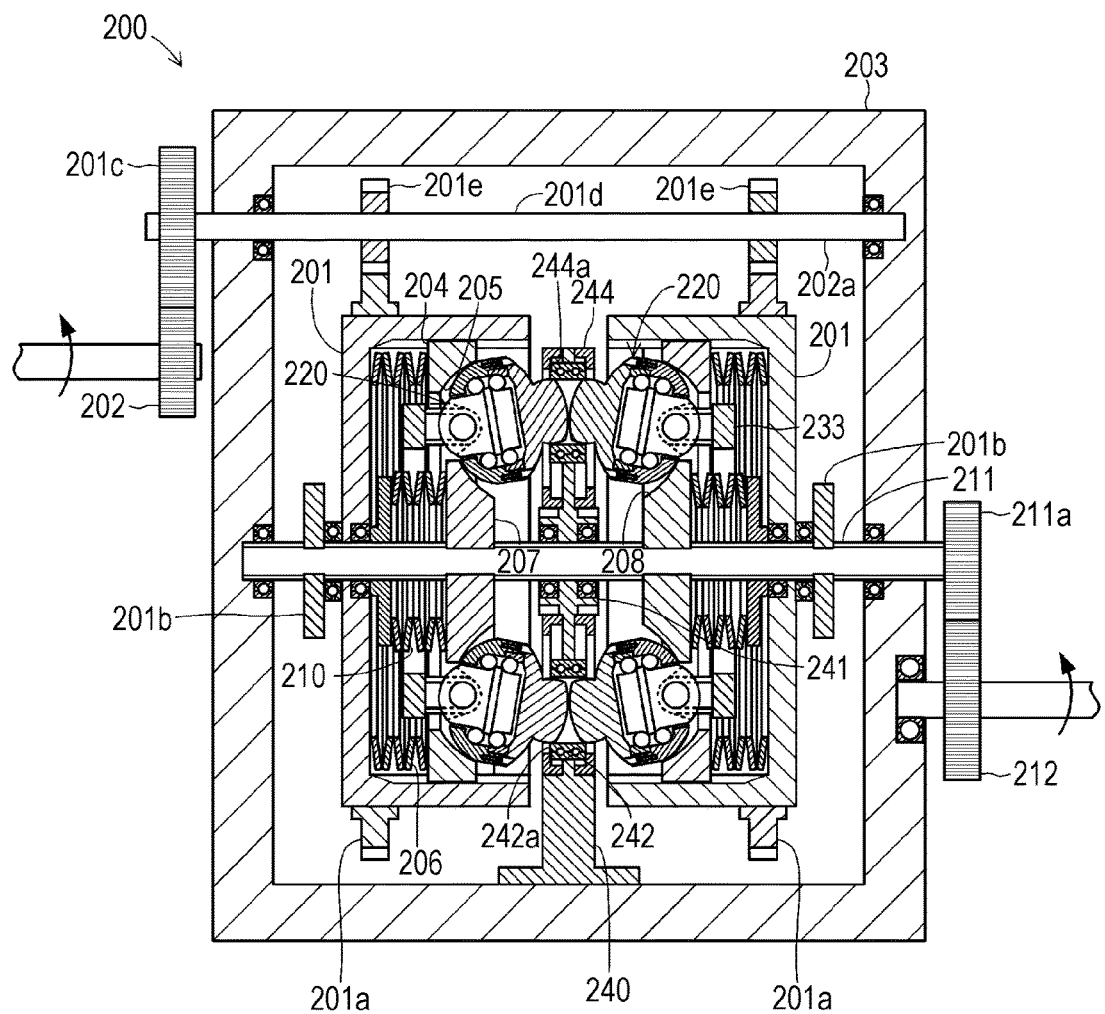
FIG. 15 is a cross-sectional view schematically illustrating the continuously variable transmission (in the LOW state) illustrated in FIG. 12.

As illustrated in FIGS. 14 and 15, similar to the cardioid rotor 121, while the cardioid rotor 221 rolls on and contacts the outer cycloid curved surface 205 and the inner cycloid curved surface 208, the cardioid rotor 221 is inclined (also referred to as "tilted") to the outer cycloid curved surface 205 side or the inner cycloid curved surface 208 side. Accordingly, the cardioid rotor 221 transmits the rotary driving power between the outer cycloid transmission body 204 and the inner cycloid transmission body 207 while changing the rotary driving power. The cardioid rotor 221 includes a steel material formed into a cylindrical shape. Cardioid curved surfaces 222, which are similar to the cardioid curved surface 122, are formed at the outer peripheral surfaces on end sides of the outer cycloid curved surface 205 side and the inner cycloid curved surface 208 side of this cardioid rotor 221.

An axially-extending support 225a is formed at an end side on a cam body 240 side opposite from the cardioid curved surface 222 in the cardioid rotor 221. The striking curved surface 225b, which is formed of a curved surface, is formed on a distal end surface of the support 225a. That is, the striking curved surface 225b is disposed on the side opposite from a direction that the cardioid curved surface 222 receives the pressing force from the outer press body 206 and the inner press body 210. Furthermore, a rolling curved surface 225c is formed on the outer peripheral surface of the support 225a.

The striking curved surface 225b is struck against the striking curved surface 225b, which is coaxially disposed adjacent to this cardioid intermediate transmission body 220, in the cardioid rotor 221. The two striking curved surfaces 225b roll on and are in contact with one another. The striking curved surface 225b is constituted of a spherical curved surface projecting out in a convex shape. In this case, the striking curved surface 225b is formed of a spherical surface around a tilt center of the cardioid intermediate transmission body 220, namely, a rotational center of the sliding pin 228. The rolling curved surface 225c is a part that rolls on and contacts the inner peripheral surfaces of holding bearings 242a when the cardioid intermediate transmission body 220 is inclined. The rolling curved surface 225c is constituted of a curved surface projecting out in a convex shape. In this case, the rolling curved surface 225c is formed of a curved surface. The cross section of this curved surface forms an arc having a center on a rotational center axis of the cardioid rotor 221, which rotates (rotates on its own axis) outside the inclined sleeve 226. This cardioid rotor 221 includes a front half where the cardioid curved surface 222 is formed and a rear half, which is a body different from the front portion, where the support 225a is formed. The front portion and the rear portion are integrally coupled to one another with bolts.

This cardioid rotor 221 is held by the inclined sleeve 226, which is disposed inside the cardioid rotor 221 via bearings 223. Similar to the bearings 123, the bearings 223 are axially arrayed in two rows on the outer peripheral surface of the inclined sleeve 226. The bearings 223 are pressed by ring-shaped bearing receivers 224 and are housed in the cardioid rotors 221. In this case, the bearing receiver 224 is pressed to the bearing 223 side by the rear half portion of the cardioid rotor 221.

Similar to the inclined sleeve 126, the inclined sleeve 226 is a component that includes a metal material processed into a cylindrical shape. The inclined sleeve 226 rotatably holds the cardioid rotor 221 via the bearings 223. A slider 227b of the rotor supporting pillar 227 slidably joins to the inner part of this inclined sleeve 226. The rotor supporting pillar 227 is a component to inclinedly support the inclined sleeve 226 to the outer cycloid transmission body 204 side or the inner cycloid transmission body 207 side. The rotator supporting pillar 227 is formed into a bar shape projecting out from a sub-support base 233.

More specifically, the rotator supporting pillar 227 has the slider 227b, which is similar to the slider 127b in the rotator supporting pillar 127, but does not has a member corresponding to the pillar 127a. The sliding pin 228 passes through the slider 227b and the inclined sleeve 226. Accordingly, this rotator supporting pillar 227 inclinedly supports the inclined sleeve 226 to the outer cycloid transmission body 204 side or the inner cycloid transmission body 207 side.

In these cardioid intermediate transmission bodies 220, the respective striking curved surfaces 225b of the two cardioid intermediate transmission bodies 220 are struck against one another. Furthermore, the sub-support base 233 supports the rotator supporting pillar 227 in each cardioid intermediate transmission body 220. The two sub-support bases 233 are disposed inside the two outer transmission body holders 201 opposed to one another. In other words, the two cardioid intermediate transmission bodies 220 are supported while being sandwiched between the two sub-support bases 233. In this case, the cam bodies 240 hold the respective rolling curved surfaces 225c in the two cardioid intermediate transmission bodies 220, which are struck against one another, via the holding bearings 242a.

Similar to the sub-support base 133, the two sub-support bases 233 are components to support the cardioid intermediate transmission bodies 220 facing the cardioid curved surface 222 to the outer cycloid transmission body 204 and the inner cycloid transmission body 207. The sub-support base 233 is formed by processing a metal material into a ring-shaped flat plate. Similar to the first embodiment, in the second embodiment, the sub-support bases 233 each support the four cardioid intermediate transmission bodies 220. A swing plate 244 supports these two sub-support bases 233 via four sub-base supporting pillars 232, which are similar to the sub-base supporting pillars 132. FIG. 12 illustrates the sub-base supporting pillars 232 by the two-dot chain lines. FIGS. 14 and 15 omit the illustration of the sub-base supporting pillars 232.

Figure 16:
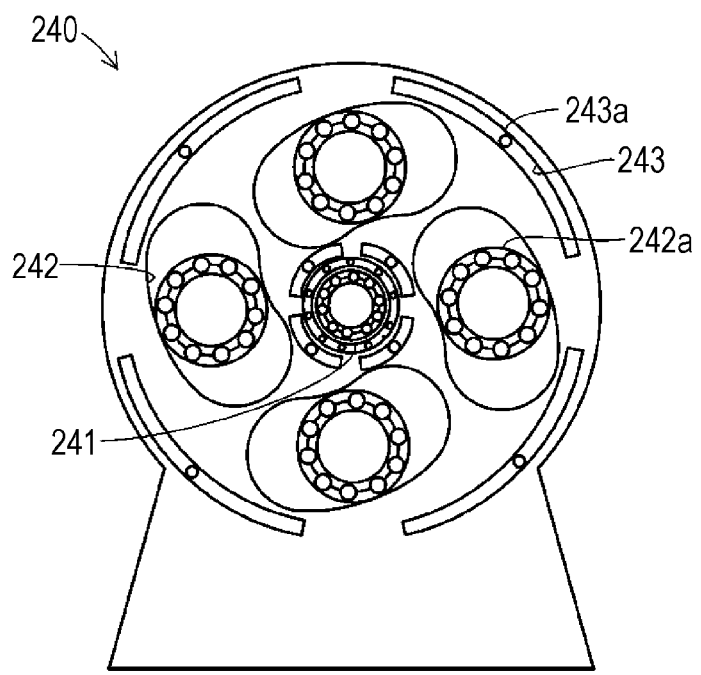
FIG. 16 is a front view illustrating an outline of an entire configuration of a cam body illustrated in FIG. 12.

The cam body 240 is a component to incline the cardioid intermediate transmission body 220 to the inner cycloid transmission body 207 side to generate pressing force against the pressing force from the outer press body 206. The cam body 240 is formed by processing a metal material into a flat plate. As illustrated in FIG. 16, this cam body 240 includes a boss 241. The output shaft 211 passes through the boss 241 via the bearings so as to slidably rotate. Four cam holes 242 are formed at a peripheral area outside this boss 241. The boss 241 is a part to hold the swing plate 244. The boss 241 is formed into a cylinder shape projecting from both surfaces of the cam body 240.

The supports 225a in the four cardioid intermediate transmission bodies 220 slide inside the four cam holes 242 via the holding bearings 242a. Accordingly, the four cam holes 242 regulate inclined angles of the cardioid intermediate transmission bodies 220 with respect to the outer cycloid transmission body 204 side and the inner cycloid transmission body 207 side. The four cam holes 242 are formed as long holes extending in a spiral pattern from the boss 241 side to the outside. That is, the cam holes 242 each swing using the output shaft 211 as the rotational center. Furthermore, the cam holes 242 each regulate a direction and an amount of the inclination of the support 225a, which is inclined with the sliding pin 228 as the inclining center, of the cardioid rotor 221, which is inclined with the sliding pin 228 as the inclining center.

Accordingly, the cam holes 242 are each formed to extend from an inner part on the output shaft 211 side with respect to the sliding pins 228, which are inclining centers of the cardioid rotors 221, to the outer portion with respect to the sliding pins 228. In this embodiment, the four cam holes 242 are formed to have a length at which the cardioid intermediate transmission bodies 220 are each inclined to the outer cycloid transmission body 204 side and the inner cycloid transmission body 207 side by 15° (namely, −15° to)+15°.

The holding bearings 242a are machine elements to hold the respective rolling curved surfaces 225c of the supports 225a in the two cardioid intermediate transmission bodies 220, which are disposed back to back to one another. To the holding bearings 242a, the rolling curved surfaces 225c are fitted be rollable along the curved surfaces. The holding bearing 242a slides inside the cam hole 242 and inside a swing long hole 244a, which will be described later. Four guide holes 243 are formed outside the four cam holes 242 in the cam body 240. These four guide holes 243 are long holes extending in an arc shape. The guide holes 243 guide bolt sleeves 243a to swing the swing plates 244 to the circumferential direction of the output shaft 211. The two swing plates 244, which are disposed on both sides of the cam bodies 240, are coupled to one another with bolts (not illustrated). The bolt sleeve 243a covers a male screw in this bolt and slides inside the guide hole 243. The bolt sleeve 243a is a metallic tubular component.

In this cam body 240, the output shaft 211 passes through the inside the boss 241 via the bearings. With this state, the lower end of the cam body 240 in FIG. 16 is secured to the inner wall of the casing 203. Thus, the cam body 240 rotatably supports the output shaft 211 together with the casing 203.

Figure 17:
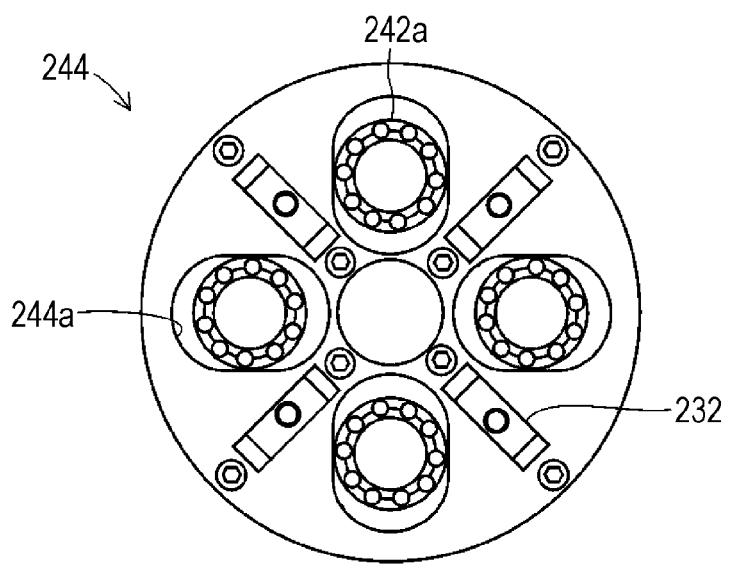
FIG. 17 is a front view illustrating an outline of an entire configuration of a swing plate illustrated in FIG. 12.

At the outer peripheral portions of the two bosses 241 in the cam bodies 240, the two swing plates 244 are mounted via the bearings. The swing plates 244 are rotatable relative to the cam bodies 240. As illustrated in FIG. 17, the respective two swing plates 244 are components to support the two sub-support bases 233 via the sub-base supporting pillars 232. The swing plate 244 is formed by processing a metal material into a disk shape. These two swing plates 244 each form four swing long holes 244a radially from the center. Furthermore, the sub-base supporting pillars 232 are mounted in a standing manner between these respective four swing long holes 244a.

The respective swing long holes 244a are through-holes to cause the swing plates 244 to rotate in both directions of the circumferential direction of the swing plates 244 with respect to the cam bodies 240 when the cardioid intermediate transmission bodies 220 are inclined. The swing long hole 244a has small opening holes and a large opening hole. The small opening holes are open small to the outer transmission body holder 201 side. The large opening hole is opened largely to the cam body 240 side. To the large opening hole, both ends of the holding bearing 242a are slidably fitted. These swing long holes 244a are formed to extend from an inner part with respect to the sliding pins 228, which are inclining centers of the cardioid rotors 221, to the outer portion with respect to the sliding pins 228. Considering the size of the holding bearings 242a, the large opening holes of these swing long holes 244a are formed at a size so as to fit with the holding bearings 242a. The small opening hole of the swing long hole 244a is formed at a size so as not to interfere with the rolling curved surface 225c of the inclined cardioid intermediate transmission body 220.

Thus, the continuously variable transmission 200 of the second embodiment is symmetrically formed. That is, the continuously variable transmission 200 each includes one set of the one outer transmission body holder 201, the one outer cycloid transmission body 204, the one inner cycloid transmission body 207, and the four cardioid intermediate transmission bodies 220 sandwiching the cam bodies 240 in the lateral direction in FIG. 12. Similar to the continuously variable transmission 100, the continuously variable transmission 200 is disposed between the engine 80 and the clutch 81. The continuously variable transmission 200 transmits the rotary driving power from the engine 80 to the clutch 81 while changing the rotary driving power.

(Actuation of Continuously Variable Transmission 200)

The following describes the actuation of the continuously variable transmission 200 configured as described above. Similar to the continuously variable transmission 100, the continuously variable transmission 200 automatically changes the gear ratio while the vehicle is traveling or temporarily stops in a runnable state (the idling state).

First, with the vehicle stopped (the clutch OFF state), as illustrated in FIG. 14, the continuously variable transmission 200 enters the TOP state. Specifically, with the continuously variable transmission 200, the rotary driving power from the engine 80 is transmitted to the two outer transmission body holders 201 via the pre-deceleration gear 202, the relay input gear 201c, the relay shaft 201d, the relay gear 201e, and the input gear 201a. This rotatably drives the respective outer cycloid transmission bodies 204. Accordingly, in the continuously variable transmission 200, the respective cardioid rotors 221 of the two cardioid intermediate transmission bodies 220, which contact the respective outer cycloid curved surfaces 205 of the two outer cycloid transmission bodies 204, rotatably drive. Furthermore, the two inner cycloid transmission bodies 207, which contact the respective cardioid curved surfaces 222 in these cardioid rotors 221, rotatably drive. Consequently, with the continuously variable transmission 200, the output shaft 211 fitted to the two inner cycloid transmission bodies 207 with the splines rotatably drives integrally with these inner cycloid transmission bodies 207.

In this case, the cardioid rotors 221 in the respective cardioid intermediate transmission bodies 220 receive the pressing force from the inner press bodies 210 via the inner cycloid transmission bodies 207. Furthermore, the cardioid rotors 221 receive the pressing force larger than the pressing force by the inner press body 210 from the outer press body 206 via the outer cycloid transmission body 204. In view of this, by the pressing force from the outer cycloid transmission body 204 side, the support 225a in the cardioid rotor 221 attempts to perform the displacement to the output shaft 211 side (inside in FIG. 16) inside the cam hole 242 with the sliding pin 228 as the rotational center.

In this case, the cardioid rotors 221 are each supported by the swing plates 244 via the sub-support base 233 and the sub-base supporting pillar 232. To the swing long holes 244a on the respective swing plates 244, the supports 225a of the cardioid rotors 221 slidably fit. Furthermore, the support 225a of the cardioid rotor 221 is supported to the cam body 240 so as to slidably rotate. Therefore, the supports 225a of the cardioid rotors 221 are each displaced to the inside in the cam holes 242 involving the rotary drive of the swing plates 244. That is, the support 225a is inclined with the sliding pin 228 as the inclining center and is displaced to the output shaft 211 side. In this case, the rolling curved surface 225c at the support 225a rolls on the inner peripheral surface of the holding bearings 242a.

Consequently, in the continuously variable transmission 200, the cardioid rotors 221 are each inclined to the outer cycloid transmission body 204 side around the sliding pins 228. In view of this, the cardioid rotors 221 each press back the inner cycloid transmission bodies 207 against the pressing force from the inner press bodies 210. This sets the continuously variable transmission 200 to the TOP state. In this case, the two cardioid intermediate transmission bodies 220, which are disposed back to back to one another, rotatably drive in the identical rotation direction and at an identical speed with the striking curved surfaces 225b struck against one another. The cardioid intermediate transmission body 220 is inclined while rolling on the striking curved surface 225b on the opposed cardioid intermediate transmission body 220.

In this case, in the two cardioid rotors 221, which are struck back to back against one another, the two striking curved surfaces 225b receive the pressing forces from the respective outer press body 206 and inner press body 210 from one another. Accordingly, in each cardioid intermediate transmission body 220, the pressing forces from the outer press body 206 and the inner press body 210 do not act on the bearings and the inclined sleeve 226 disposed inside the cardioid rotor 221. This ensures smooth rotary drive of the cardioid rotor 221. Furthermore, this ensures improving durability of the cardioid intermediate transmission body 220.

In this TOP state, similar to the continuously variable transmission 100, the continuously variable transmission 200 changes the rotary driving power at the gear ratio according to a position where the outer cycloid curved surface 205 of the outer cycloid transmission body 204 contacts the cardioid curved surface 222 of the cardioid rotor 221 and a position where the inner cycloid curved surface 208 of the inner cycloid transmission body 207 contacts the cardioid curved surface 222 of the cardioid rotor 221 (see Expression 3).

In the case where the vehicle starts moving with the continuously variable transmission 200 in such TOP state, the continuously variable transmission 200 instantaneously transitions to the LOW state (see FIG. 15). Specifically, in the continuously variable transmission 200, when the clutch 81 enters a clutch ON state where the rotary driving power is transmitted, a load from the driving wheel 90 is applied to the respective inner cycloid transmission bodies 207 via the output shaft 211. Therefore, a torque difference occurs between the inner cycloid transmission body 207 and the outer cycloid transmission body 204. The torque difference in this case is generated by the load on the inner cycloid transmission body 207, which serves as the output side member, side attempting to avoid the rotary drive on the outer cycloid transmission body 204, which serves as the input side member, side.

Accordingly, the cardioid rotors 221 each revolve in a direction corresponding to the load, namely, a direction identical to the own rotation direction of the respective cardioid rotors 221 with the output shaft 211 as the rotational center. In this case, the long-hole shaped cam holes 242 each extend outside along the revolving direction of the respective cardioid rotors 221. In view of this, in accordance with the rotational displacement of the respective cardioid rotors 221 involving the rotational displacement of the swing plates 244, the supports 225a are each guided to the outside.

Consequently, in the continuously variable transmission 200, the cardioid rotors 221 are each inclined to the inner cycloid transmission bodies 207 side around the sliding pins 228. In view of this, the cardioid rotors 221 press back the respective outer cycloid transmission bodies 204 against the pressing force from the outer press bodies 206. This sets the continuously variable transmission 200 to the LOW state. In this case, the rolling curved surface 225c in the support 225a rolls the inner peripheral surface of the holding bearing 242a. The two cardioid intermediate transmission bodies 220, which are disposed back to back to one another, rotatably drive in an identical rotation direction at an identical speed with the striking curved surfaces 225b struck against to one another. The cardioid intermediate transmission body 220 is inclined while rolling on the striking curved surface 225b on the opposed cardioid intermediate transmission body 220.

Then, the continuously variable transmission 200 changes the rotary driving power at the gear ratio according to positions where the outer cycloid curved surfaces 205 of the respective outer cycloid transmission bodies 204 contact the cardioid curved surfaces 222 of the respective cardioid rotors 221 and positions where the inner cycloid curved surfaces 208 of the respective inner cycloid transmission bodies 207 contact the cardioid curved surfaces 222 of the respective cardioid rotors 221. Specifically, the continuously variable transmission 200 has the gear ratio shown by Expression 3 in the process of displacement of the inner cycloid transmission bodies 207 and the outer cycloid transmission bodies 204. That is, the continuously variable transmission 200 causes the output shaft 211 to rotatably drive at a low rotation and a high torque using the rotary driving power from the engine 80.

In the process of inclining these respective cardioid rotors 221, the respective cardioid rotors 221 roll on the outer cycloid curved surfaces 205 and the inner cycloid curved surfaces 208. In this respect, the sliding friction and the slip do not occur in the inclining direction between the cardioid curved surfaces 222 of the respective cardioid rotors 221 and the outer cycloid curved surfaces 205 of the respective outer cycloid transmission body 204; and between the respective cardioid curved surfaces 222 and the inner cycloid curved surfaces 208 of the respective inner cycloid transmission bodies 207. Similar to the first embodiment, the reason is that the outer cycloid curved surfaces 205 and the inner cycloid curved surfaces 208 are each constituted of the cycloid curve Cy. The moving circle radius b of the cycloid curve Cy is twice as large as the moving circle radius a of the cardioid curve Ca, which constitutes the cardioid curved surface 222.

Next, when the vehicle is started to move, the continuously variable transmission 200 in the TOP state instantaneously transitions to the LOW state. Afterwards, the continuously variable transmission 200 transitions to the TOP state in accordance with a smaller torque difference between the inner cycloid transmission bodies 207 and the outer cycloid transmission bodies 204 as the speed of the vehicle increases. Specifically, the increase in the rotation speed of the driving wheel 90 reduces the torque difference between the inner cycloid transmission bodies 207 and outer cycloid transmission bodies 204. In view of this, in the continuously variable transmission 200, resistive power from the respective inner cycloid transmission bodies 207 against the rotary drive of the cardioid rotors 221 reduces, reducing power of revolving the respective cardioid rotors 221 with respect to the cam bodies 240.

Accordingly, the cardioid rotors 221 each start revolving in a direction opposite from the own rotation direction of the cardioid rotors 221. In this case, the cam holes 242 each extend inside along the opposite revolving direction of the respective cardioid rotors 221. In view of this, in accordance with the rotational displacement of the respective cardioid rotors 221 involving the rotational displacement of the swing plates 244, the supports 225a are each guided to the inside.

Consequently, in the continuously variable transmission 200, the cardioid rotors 221 are each inclined to the outer cycloid transmission bodies 204 side again around the sliding pins 228 by the pressing force from the outer press bodies 206. In view of this, the cardioid rotors 221 press back the respective inner cycloid transmission bodies 207 against the pressing force from the inner press bodies 210. This sets the continuously variable transmission 200 to the TOP state. In this case, the rolling curved surface 225c in the support 225a rolls the inner peripheral surface of the holding bearing 242a. The two cardioid intermediate transmission bodies 220, which are disposed back to back to one another, rotatably drive in an identical rotation direction at an identical speed with the striking curved surfaces 225b struck against to one another. The cardioid intermediate transmission body 220 is inclined while rolling on the striking curved surface 225b on the opposed cardioid intermediate transmission body 220. Obviously, the continuously variable transmission 200 goes through the MID state illustrated in FIG. 12 in a process of transition from the LOW state to the TOP state.

The gear ratio of the continuously variable transmission 200 in the process of transition from this LOW state to the TOP state becomes a gear ratio according to the positions where the outer cycloid curved surfaces 205 of the respective outer cycloid transmission bodies 204 contact the cardioid curved surfaces 222 of the respective cardioid rotors 221 and positions where the inner cycloid curved surfaces 208 of the respective inner cycloid transmission body 207 contact the cardioid curved surfaces 222 of the respective cardioid rotors 221, namely, the gear ratio shown by Expression 3.

Meanwhile, at a deceleration of the travelling vehicle, the continuously variable transmission 200 generates a so-called back torque, which is a power attempting to rotatably drive the outer cycloid transmission bodies 204 from the respective inner cycloid transmission bodies 207 to the outer cycloid transmission bodies 204. In this case, the cardioid rotor 221 does not rotate with respect to the cam body 240 and is not displaced, maintaining the TOP state of the continuously variable transmission 200.

When the vehicle accelerates again after the deceleration, as described above, the gear ratio of the continuously variable transmission 200 instantaneously transitions to the LOW state side. In this case, the continuously variable transmission 200 transitions to the LOW state side according to a torque difference between each inner cycloid transmission body 207 and each outer cycloid transmission body 204. That is, the continuously variable transmission 200 enters the MID state (see FIG. 1) or a state close to the MID state. Then, as described above, the continuously variable transmission 200 transitions to the TOP state again according to the acceleration of the vehicle.

Meanwhile, with the vehicle stopped, the continuously variable transmission 200 maintains the TOP state. In the case where the vehicle starts moving, as described above, the continuously variable transmission 200 instantaneously transitions to the LOW state and then transitions to the TOP state according to the increase in the vehicle speed.

As apparent from the actuation explanation, according to the second embodiment, the continuously variable transmission 200 includes the striking curved surfaces 225b, which are formed on the sides opposite from the respective cardioid curved surfaces 222, such that the two cardioid intermediate transmission bodies 220 are struck against to one another. This allows the two cardioid intermediate transmission bodies 220, which are disposed back to back to one another, to mutually receive the pressing forces applied to the respective cardioid curved surfaces 222. Accordingly, with the continuously variable transmission 200 according to the embodiment, the components other than the components on which the cardioid curved surfaces 222 and the striking curved surfaces 225b are formed are less likely to receive the pressing forces from the outer press body 206 and the inner press body 210. This ensures improving the durability of the continuously variable transmission 200.

Furthermore, the embodiments and aspects of the present disclosure are not limited to the respective embodiments. The embodiments can be variously changed without departing from the object of the technique of the present disclosure. Modifications described below are mutually applicable. In descriptions for the respective modifications, like reference numerals designate corresponding or identical elements.

For example, in the respective embodiments, the continuously variable transmission 100 (200) includes the four cardioid intermediate transmission bodies 120 (220) with respect to the one outer cycloid transmission body 104 (204) and the one inner cycloid transmission body 107 (207). However, the number of installed cardioid intermediate transmission bodies 120 (220) is not limited to the embodiments. It is only necessary that at least the one cardioid intermediate transmission body 120 (220) is disposed for the one outer cycloid transmission body 104 (204) and the one inner cycloid transmission body 107 (207).

In the respective embodiments, the continuously variable transmission 100 (200) includes the outer press body 106 (206) and the inner press body 110 (210) both of which includes the disc springs. That is, the outer press body 106 (206) is equivalent to one example of the outer press unit according to the present disclosure. Furthermore, the inner press body 110 (210) is equivalent to one example of the inner press unit according to the present disclosure.

It is only necessary that the outer press unit and the inner press unit can elastically press the respective outer cycloid transmission body 104 (204) and inner cycloid transmission body 107 (207). Accordingly, the outer cycloid transmission body 104 (204) and the inner cycloid transmission body 107 (207) may include a spring other than the disc spring, for example, a coil spring or a various elastic bodies such as rubber. Furthermore, the outer cycloid transmission body 104 (204) and the inner cycloid transmission body 107 (207) may include an elastic body other than a spring. Accordingly, for example, the outer press body 106 (206) and the inner press body 110 (210) may include various actuators such as a hydraulic or a pneumatic piston or an electric motor.

In the case where the outer press body 106 (206) and the inner press body 110 (210) include various actuators, the continuously variable transmission 100 (200) may include a control device (a computer) to control these actuators. The computer control can freely change the gear ratio according to the speed of the vehicle, the rotation speed of the engine 80, or the driver's will at any given timing. That is, the control device, which controls the various actuators of the outer press body 106 (206) and the inner press body 110 (210) with the computer, is equivalent to the example of the cardioid intermediate transmission body inclining unit according to the present disclosure. The cardioid intermediate transmission body inclining unit inclines the cardioid curved surface 122 (222) to the outer cycloid curved surface 105 (205) side or the inner cycloid curved surface 108 (208) side to change respective positions where the cardioid curved surface 122 (222) rolls on and contacts the outer cycloid curved surface 105 (205) and the inner cycloid curved surface 108 (208).

With the respective embodiments, the continuously variable transmission 100 (200) uses the outer press body 106 (206) and the cam body 134 (240) to incline the cardioid curved surface 122 (222) to the outer cycloid curved surface 105 (205) side or the inner cycloid curved surface 108 (208) side. That is, the outer press body 106 (206) and the cam body 134 (240) are equivalent to the example of the cardioid intermediate transmission body inclining unit according to the present disclosure. As long as the cardioid intermediate transmission body inclining unit can incline the cardioid curved surface 122 (222) to the outer cycloid curved surface 105 (205) side or the inner cycloid curved surface 108 (208) side, the cardioid intermediate transmission body inclining unit is not limited to one according to the respective embodiments. The cardioid intermediate transmission body inclining unit may be the elastic body other than the disc spring or may be the computer control device.

The outer press body 106 (206) provides the pressing force stronger than the inner press body 110 (210), thus constituting a part of the cardioid intermediate transmission body inclining unit. Accordingly, with the outer press body 106 (206) and the inner press body 110 (210) configured to be identical pressing force strength, the cardioid intermediate transmission body inclining unit that inclines the cardioid curved surface 122 to the outer cycloid curved surface 105 side is separately disposed.

With the embodiments, the continuously variable transmission 100 (200) functions as a step-up gear by Expression 3, which represents the gear ratio. That is, with the continuously variable transmission 100 (200), the rotation speed for output increases more than the rotation speed for input. In view of this, the continuously variable transmission 100 (200) includes the pre-deceleration gear 102 (202) and the post-deceleration gear 112 (212) to the respective input side and output side of the continuously variable transmission 100 (200) for deceleration. However, the continuously variable transmission according to the present disclosure can also function as a reduction gear.

Figure 18:
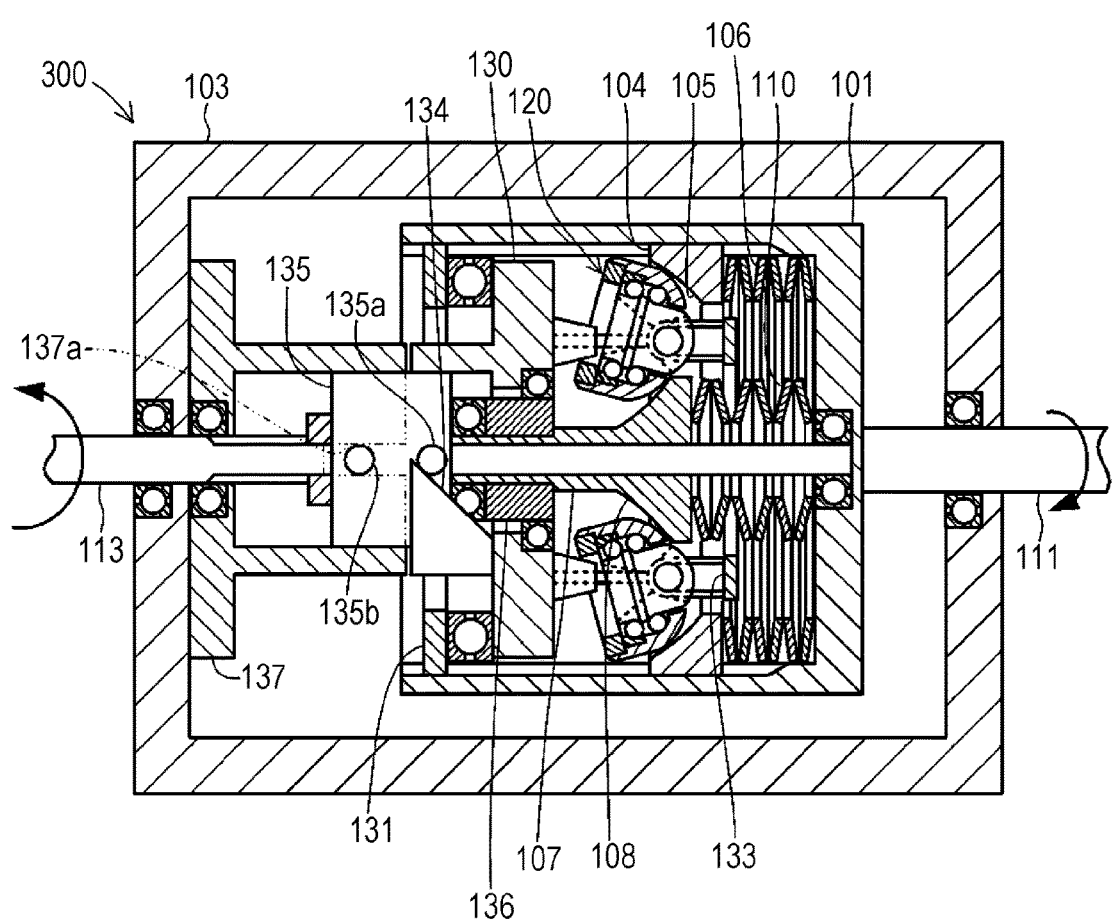
FIG. 18 is a cross-sectional view schematically illustrating an outline of an entire configuration of a continuously variable transmission (in the TOP state) according to a modification of the present disclosure.

For example, FIG. 18 illustrates a continuously variable transmission 300 that functions as a reduction gear. In this continuously variable transmission 300, the input side and the output side for rotary driving power are switched from the configuration of the continuously variable transmission 100. Furthermore, the magnitude relationship of pressing forces between the outer press body 106 and the inner press body 110 is switched. Furthermore, an orientation of the inclined surface of the cam body 134 is changed. More specifically, in the continuously variable transmission 300, the pressing force by the inner press body 110 pressing the inner cycloid transmission body 107, which becomes the input side member, is stronger than the pressing force by the outer press body 106 pressing the outer cycloid transmission body 104, which becomes the output side member.

In the continuously variable transmission 300, the inclined surface of the cam body 134 is formed so as to be the following orientation. When the torque of the inner cycloid transmission body 107, which serves as the input side member, exceeds the torque of the outer cycloid transmission body 104, which serves as the output side member, the inner cycloid transmission body 107 is pressed to the inner press body 110 side to cause the cardioid intermediate transmission body 120 to be inclined to the outer cycloid transmission body 104 side. In view of this, the sleeve receiver 136, which receives the pressing sleeve 135 in the relatively rotatable state, is disposed on the end on the right side in FIG. 18 of the pressing sleeve 135, which is the pressing sleeve 135 displacement direction, via the bearings when the continuously variable transmission 300 shifts the gear to the LOW state.

Accordingly, in the continuously variable transmission 300, the inner cycloid transmission body 107 rotatably drives by the rotary driving power from the engine 80 transmitted via an input shaft 113. Furthermore, the outer cycloid transmission body 104 rotatably drives via the cardioid intermediate transmission body 120. Consequently, the changed rotary driving power is output to the outside via the output shaft 111. The continuously variable transmission 300 functions as a reduction gear according to Expression 3, which represents the gear ratio. That is, in the continuously variable transmission 300, the rotation speed for output reduces more than the rotation speed for input. Accordingly, the continuously variable transmission 300 needs not to include the pre-deceleration gear 102 (202) and the post-deceleration gear 112 (212). This ensures reducing the weight of and simplifying the configuration of the continuously variable transmission 300. Obviously, the continuously variable transmission 200 also can function as the reduction gear through modifications similar to the continuously variable transmission 300. FIG. 18 illustrates the rotation direction and the magnitude of the rotary driving power from the engine 80 transmitted to the input shaft 113 and the rotation direction and the magnitude of the rotary driving power output from the output shaft 111 to the outside by directions and sizes of the arrows, respectively.

Thus, one of the outer cycloid transmission body 104 and the inner cycloid transmission body 107 may be the input side member, and the other may be the output side member. The cardioid intermediate transmission body inclining unit may include the outer press body 106 or the inner press body 110 that presses the input side member at a pressing force larger than a pressing force by the inner press body 110 or the outer press body 106 pressing the output side member. When a torque of the outer cycloid transmission body 104 or the inner cycloid transmission body 107 serving as the input side member exceeds a torque of the inner cycloid transmission body 107 or the outer cycloid transmission body 104 serving as the output side member, the cardioid intermediate transmission body inclining unit inclines the cardioid intermediate transmission body 120 to the side of the inner cycloid transmission body 107 or the outer cycloid transmission body 104 serving as the output side member.

Further, the cardioid intermediate transmission body inclining unit may include a cam (the cam body 134). The cam may incline the cardioid intermediate transmission body 120 to the side of the inner cycloid transmission body 107 or the outer cycloid transmission body 104 serving as the output side member using a power of the torque difference.

Furthermore, the cardioid intermediate transmission body inclining unit may relatively change a pressing force from the outer press body 106 and a pressing force from the inner press body 110 to change respective positions of the outer cycloid transmission body 104 and the inner cycloid transmission body 107 with respect to the cardioid intermediate transmission body 120 and to incline the cardioid curved surface 122 to the outer cycloid curved surface 105 side or the inner cycloid curved surface 108 side.

With the respective embodiments, the continuously variable transmission 100 (200) includes the outer cycloid transmission body 104 (204) as the input side member so as to rotatably drive and also be displaceable back and forth to the cardioid intermediate transmission body 120 (220) side. Furthermore, the inner cycloid transmission body 107 (207) as the output side member is disposed to rotatably drive and also be displaceable back and forth to the cardioid intermediate transmission body 120 (220) side. In this case, the cardioid intermediate transmission body 120 (220) is configured to swing with the output shaft 111 (211) as the rotational center in all embodiments; therefore, the cardioid intermediate transmission body 120 (220) does not rotatably drive.

However, it is only necessary that one of the outer cycloid transmission body 104 (204) and the cardioid intermediate transmission body 120 (220) be disposed to be displaceable back and forth to the other. It is only necessary that the outer press unit be configured to press the one displaceable back and forth to the other side.

It is only necessary that one of the inner cycloid transmission body 107 (207) and the cardioid intermediate transmission body 120 (220) be disposed to be displaceable back and forth to the other. It is only necessary that the inner press unit be configured to press the one displaceable back and forth to the other side.

With the continuously variable transmission according to the present disclosure, it is only necessary that one of the outer cycloid transmission body, the inner cycloid transmission body, and the cardioid intermediate transmission body be supported to rotatably drive as an input side member of rotary driving power to the outside (an input side member that inputs the rotary driving power from the outside). Furthermore, it is only necessary that one among the remaining two be supported to rotatably drive as an output side member of the rotary driving power to the outside (an output side member that outputs the rotary driving power to the outside). Accordingly, the continuously variable transmission of the present disclosure is not limited to the respective embodiments. To use the cardioid intermediate transmission body as the input side member or the output side member, the cardioid intermediate transmission body revolves inside the outer cycloid transmission body (in other words, outside the inner cycloid transmission body). That is, with the continuously variable transmission according to the present disclosure, one of the outer cycloid transmission body, the inner cycloid transmission body, and the cardioid intermediate transmission body is disposed with the rotary drive restrained. Furthermore, the one among the remaining two is disposed in a state of having difficulty in axial displacement. Accordingly, for example, as illustrated in FIG. 19, at least nine configuration aspects are considered.

Figure 19:
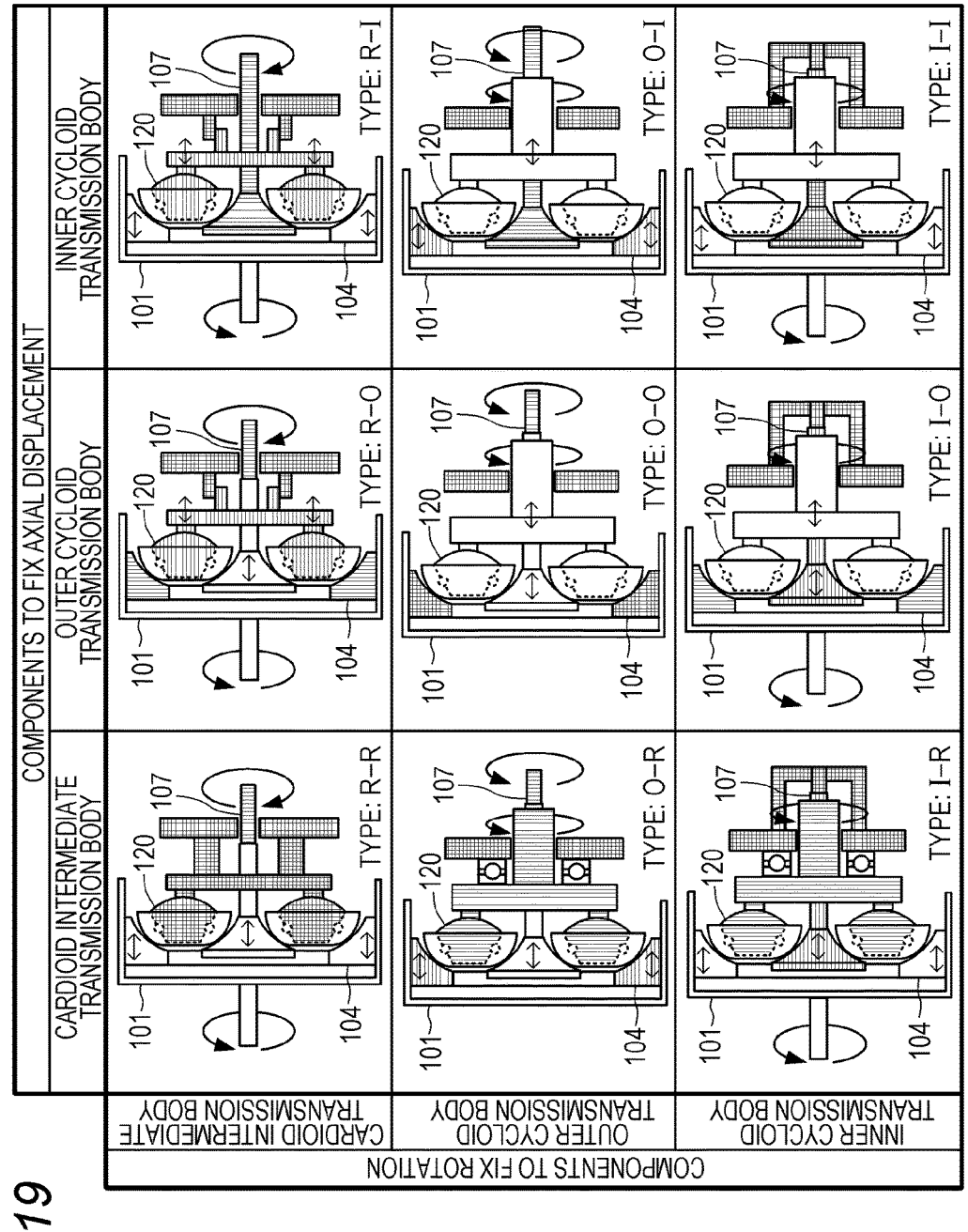
FIG. 19 is a list illustrating a variation of configurations and aspects of a continuously variable transmission according to another modification of the present disclosure.

FIG. 19 schematically illustrates the nine configuration aspects for continuously variable transmission based on the configuration of the continuously variable transmission 100 for ease of understanding. In view of this, FIG. 19 mainly illustrates the outer transmission body holder 101, the outer cycloid transmission body 104, the inner cycloid transmission body 107, and the cardioid intermediate transmission body 120 while omits the illustration of other constitutions such as the outer press body 106, the inner press body 110, and the cam body 134. FIG. 19 illustrates the nine configuration aspects for the continuously variable transmission assuming that the cardioid rotors 121 in the cardioid intermediate transmission bodies 120 rotatably drive (namely, rotate on their own axes) with respect to the inclined sleeves 126 and incline to the outer cycloid transmission body 104 side and the inner cycloid transmission body 107 side. In the nine configuration aspects for the continuously variable transmission illustrated in FIG. 19, parts that do not rotatably drive around the rotational center axis (parts in a rotatably fixed state) when the input side member and the output side member rotatably drive are illustrated by horizontal hatches. Furthermore, parts that are not displaced back and forth in the axis direction of the rotational center axis (parts in a slidably fixed state) are illustrated by vertical hatches. Furthermore, the parts in the rotatably fixed state and the slidably fixed state are illustrated by grid-like hatches. FIG. 19 illustrates movable directions of the respective components in the nine configuration aspects for the continuously variable transmission by arrows.

First, with the R-R type, the cardioid intermediate transmission body 120 is in the rotatably fixed state (the state where the cardioid intermediate transmission body 120 does not revolve around the rotational center axis) and in the slidably fixed state. With this R-R type continuously variable transmission, one of the outer cycloid transmission body 104 and the inner cycloid transmission body 107 serves as the input side member, and the other serves as the output side member. This type has a configuration similar to the continuously variable transmission 100 according to the first embodiment and the continuously variable transmission 200 according to the second embodiment.

Next, with the R-O type, the cardioid intermediate transmission body 120 is in the rotatably fixed state (the state where the cardioid intermediate transmission body 120 does not revolve around the rotational center axis). Furthermore, the outer cycloid transmission body 104 is in the slidably fixed state. With this R-O type continuously variable transmission, the cardioid intermediate transmission body 120 is slidably displaced instead of the outer cycloid transmission body 104. One of the outer cycloid transmission body 104 and the inner cycloid transmission body 107 serves as the input side member, and the other serves as the output side member.

Next, with the R-I type, the cardioid intermediate transmission body 120 is in the rotatably fixed state (the state where the cardioid intermediate transmission body 120 does not revolve around the rotational center axis). Furthermore, the inner cycloid transmission body 107 is in the slidably fixed state. With this R-I type continuously variable transmission, the cardioid intermediate transmission body 120 is slidably displaced instead of the inner cycloid transmission body 107. One of the outer cycloid transmission body 104 and the inner cycloid transmission body 107 serves as the input side member and the other serves as the output side member.

Next, with the O-R type, the outer cycloid transmission body 104 is in the rotatably fixed state. Furthermore, the cardioid intermediate transmission body 120 is in the slidably fixed state. With this O-R type continuously variable transmission, the cardioid intermediate transmission body 120 rotatably drives (revolvingly drives) instead of the outer cycloid transmission body 104. One of the cardioid intermediate transmission body 120 and the inner cycloid transmission body 107 serves as the input side member, and the other serves as the output side member.

Next, with the O-O type, the outer cycloid transmission body 104 is in the rotatably fixed state and the slidably fixed state. With this O-O type continuously variable transmission, the cardioid intermediate transmission body 120 rotatably drives (revolvingly drives) and slides instead of the outer cycloid transmission body 104. One of the cardioid intermediate transmission body 120 and the inner cycloid transmission body 107 serves as the input side member, and the other serves as the output side member.

Next, with the O-I type, the outer cycloid transmission body 104 is in the rotatably fixed state. Furthermore, the inner cycloid transmission body 107 is in the slidably fixed state. With this O-I type continuously variable transmission, the cardioid intermediate transmission body 120 rotatably drives (revolvingly drives) instead of the inner cycloid transmission body 107. One of the cardioid intermediate transmission body 120 and the inner cycloid transmission body 107 serves as the input side member, and the other serves as the output side member.

Next, with the I-R type, the inner cycloid transmission body 107 is in the rotatably fixed state. Furthermore, the cardioid intermediate transmission body 120 is in the slidably fixed state. With this I-R type continuously variable transmission, the cardioid intermediate transmission body 120 rotatably drives (revolvingly drives) instead of the inner cycloid transmission body 107. One of the outer cycloid transmission body 104 and the cardioid intermediate transmission body 120 serves as the input side member, and the other serves as the output side member.

Next, with the I-O type, the inner cycloid transmission body 107 is in the rotatably fixed state. Furthermore, the outer cycloid transmission body 104 is in the slidably fixed state. With this I-O type continuously variable transmission, the cardioid intermediate transmission body 120 is slidably displaced instead of the outer cycloid transmission body 104. One of the outer cycloid transmission body 104 and the cardioid intermediate transmission body 120 serves as the input side member, and the other serves as the output side member.

Next, with the I-I type, the inner cycloid transmission body 107 is in the rotatably fixed state and in the slidably fixed state. With this I-I type continuously variable transmission, the cardioid intermediate transmission body 120 is slidably displaced instead of the inner cycloid transmission body 107. One of the outer cycloid transmission body 104 and the cardioid intermediate transmission body 120 serves as the input side member, and the other serves as the output side member.

The examples shown in the respective embodiments apply the continuously variable transmission 100 (200) to the two-wheeled vehicle. However, the continuously variable transmission according to the present disclosure can be used as a continuously variable transmission in an automotive vehicle other than the two-wheeled vehicle. The continuously variable transmission according to the present disclosure, for example, can be used as a continuously variable transmission in various motor vehicles such as a three-wheeled vehicle and a four-wheeled vehicle and a man-powered vehicle not having a power engine, for example, a two-wheeled bicycle, a three-wheeled bicycle, or a four-wheeled bicycle. The continuously variable transmission according to the present disclosure is widely applicable to various apparatuses that change a rotary driving power on an original driving side and transmit the rotary driving power to a driven side, for example, an electric generator and a machine tool such as a machining center or an ascensor such as an elevator and an unloader.

In the respective embodiments, the cardioid rotor 121 (221) is inclined centering the starting point (the cusp OP) of the cardioid curve Ca, which forms the cardioid curved surface 122 (222). However, the inclining center of this cardioid rotor 121 (221) does not need to strictly match the starting point (the cusp OP) of the cardioid curve Ca. Considering a position shift due to a tolerance on production accuracy, a cumulative error, or an oil film, and a similar error, a range of a degree of match between the inclining center of the cardioid rotor 121 (221) and the starting point (the cusp OP) of the cardioid curve Ca includes a range that can be regarded as a practical match (for example, a region in a radius 0.5-mm circle from the starting point). It is preferable that the inclining center of the cardioid rotor 121 (221) be on a straight line connecting the starting point and the ending point of the cycloid curve Cy1, which forms the outer cycloid curved surface 105 (205), and the cycloid curve Cy2, which forms the inner cycloid curved surface 108 (208) (see FIGS. 10 and 11).

As illustrated in FIG. 6, the inclination of the cardioid rotors 121 to the inner cycloid transmission body 107 side means the inclination (of the hub flange 137 side) of the cardioid intermediate transmission bodies 120 to the outer cycloid transmission body 104 side. Similarly, as illustrated in FIG. 5, the inclination of the cardioid rotors 121 to the outer cycloid transmission body 104 side means the inclination (of the hub flange 137 side) of the cardioid intermediate transmission bodies 120 to the inner cycloid transmission body 107 side.

Further, as illustrated in FIG. 14, the inclination of the cardioid rotors 221 to the outer cycloid transmission body 204 side means the inclination (of the rear half portions) of the cardioid intermediate transmission bodies 220 to the inner cycloid transmission body 207 side. Similarly, as illustrated in FIG. 15, the inclination of the cardioid rotors 221 to the inner cycloid transmission body 207 side means the inclination (of the rear half portions) of the cardioid intermediate transmission bodies 220 to the outer cycloid transmission body 204 side.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A continuously variable transmission comprising:
   a cardioid intermediate transmission body having a cardioid curved surface, the cardioid curved surface having a linearly symmetrical cross section formed with a cardioid curve, the cardioid intermediate transmission body being supported such that the cardioid curved surface is rotatably drivable around a symmetrical axis and is inclinable in opposite directions relative to a starting point of the cardioid curve, the cardioid curve forming the cardioid curved surface;
   an outer cycloid transmission body formed into a ring shape, the outer cycloid transmission body having a concave-shaped outer cycloid curved surface on an inner peripheral surface, the cardioid curved surface rolling on and contacting the outer cycloid curved surface while inclining, the outer cycloid curved surface being constituted of a cycloid curve, the cycloid curve having a moving circle radius twice as large as a moving circle radius of the cardioid curve constituting the cardioid curved surface;

an inner cycloid transmission body having a concave-shaped inner cycloid curved surface symmetrical to the outer cycloid curved surface, the inner cycloid curved surface being disposed at a position opposed to the outer cycloid curved surface via the cardioid curved surface, the cardioid curved surface rolling on and contacting the inner cycloid curved surface while inclining;

an outer press unit adapted to reciprocally displace the outer cycloid transmission body relative to the cardioid intermediate transmission body;

an inner press unit adapted to reciprocally displace, the inner cycloid transmission body relative to the cardioid intermediate transmission body; and a cardioid intermediate transmission body inclining unit that inclines the cardioid curved surface to the outer cycloid curved surface side or the inner cycloid curved surface side to change respective positions where the cardioid curved surface rolls on and contacts the outer cycloid curved surface and the inner cycloid curved surface, wherein one of the outer cycloid transmission body, the inner cycloid transmission body, and the cardioid intermediate transmission body is supported to rotatably drive as an input side member of rotary driving power, one among the remaining two being supported to rotatably drive as an output side member of the rotary driving power.

2. The continuously variable transmission according to claim 1, wherein one of the outer cycloid transmission body and the inner cycloid transmission body serves as the input side member while the other serves as the output side member, the cardioid intermediate transmission body inclining unit includes the outer press unit or the inner press unit, the outer press unit or the inner press unit pressing the input side member at a pressing force larger than a pressing force by inner press unit or the outer press unit pressing the output side member, and when a torque of the outer cycloid transmission body or the inner cycloid transmission body serving as the input side member exceeds a torque of the inner cycloid transmission body or the outer cycloid transmission body serving as the output side member, the cardioid intermediate transmission body inclining unit inclines the cardioid intermediate transmission body to the side of the inner cycloid transmission body or the outer cycloid transmission body serving as the output side member.

3. The continuously variable transmission according to claim 2, wherein the cardioid intermediate transmission body inclining unit includes a cam, the cam inclining the cardioid intermediate transmission body to the side of the inner cycloid transmission body or the outer cycloid transmission body serving as the output side member using a power of a torque difference between the outer cycloid transmission body and the inner cycloid transmission body.

4. The continuously variable transmission according to claim 1, wherein the cardioid intermediate transmission body inclining unit relatively changes a pressing force from the outer press unit and a pressing force from the inner press unit to change respective positions of the outer cycloid transmission body and the inner cycloid transmission body with respect to the cardioid intermediate transmission body, so as to incline the cardioid curved surface to the outer cycloid curved surface side or the inner cycloid curved surface side.

5. The continuously variable transmission according to claim 2, wherein the cardioid intermediate transmission body inclining unit relatively changes a pressing force from the outer press unit and a pressing force from the inner press unit to change respective positions of the outer cycloid transmission body and the inner cycloid transmission body with respect to the cardioid intermediate transmission body, so as to incline the cardioid curved surface to the outer cycloid curved surface side or the inner cycloid curved surface side.

6. The continuously variable transmission according to claim 3, wherein the cardioid intermediate transmission body inclining unit relatively changes a pressing force from the outer press unit and a pressing force from the inner press unit to change respective positions of the outer cycloid transmission body and the inner cycloid transmission body with respect to the cardioid intermediate transmission body, so as to incline the cardioid curved surface to the outer cycloid curved surface side or the inner cycloid curved surface side.

7. The continuously variable transmission according to claim 1, wherein the cardioid intermediate transmission body has a striking curved surface, the striking curved surface being formed on a side opposite from a direction where the cardioid curved surface receives a pressing force from the outer press unit and the inner press unit, and the cardioid intermediate transmission body comprising a first cardioid intermediate transmission body and a second cardioid intermediate transmission body, the striking curved surface of the first cardioid intermediate transmission body contacting the striking curved surface of the second cardioid intermediate transmission body.

8. The continuously variable transmission according to claim 2, wherein the cardioid intermediate transmission body has a striking curved surface, the striking curved surface being formed on a side opposite from a direction where the cardioid curved surface receives a pressing force from the outer press unit and the inner press unit, and the cardioid intermediate transmission body comprising a first cardioid intermediate transmission body and a second cardioid intermediate transmission body, the striking curved surface of the first cardioid intermediate transmission body contacting the striking curved surface of the second cardioid intermediate transmission body.

9. The continuously variable transmission according to claim 3, wherein the cardioid intermediate transmission body has a striking curved surface, the striking curved surface being formed on a side opposite from a direction where the cardioid curved surface receives a pressing force from the outer press unit and the inner press unit, and the cardioid intermediate transmission body comprising a first cardioid intermediate transmission body and a second cardioid intermediate transmission body, the striking curved surface of the first cardioid intermediate transmission body contacting the striking curved surface of the second cardioid intermediate transmission body.

10. The continuously variable transmission according to claim 4, wherein the cardioid intermediate transmission body has a striking curved surface, the striking curved surface being formed on a side opposite from a direction where the cardioid curved surface receives a pressing force from the outer press unit and the inner press unit, and the cardioid intermediate transmission body comprising a first cardioid intermediate transmission body and a second cardioid intermediate transmission body, the striking curved surface of the first cardioid intermediate transmission body contacting the striking curved surface of the second cardioid intermediate transmission body.

11. The continuously variable transmission according to claim 5, wherein the cardioid intermediate transmission body has a striking curved surface, the striking curved surface being formed on a side opposite from a direction where the cardioid curved surface receives a pressing force from the outer press unit and the inner press unit, and the cardioid intermediate transmission body comprising a first cardioid intermediate transmission body and a second cardioid intermediate transmission body, the striking curved surface of the first cardioid intermediate transmission body contacting the striking curved surface of the second cardioid intermediate transmission body.

12. The continuously variable transmission according to claim 6, wherein the cardioid intermediate transmission body has a striking curved surface, the striking curved surface being formed on a side opposite from a direction where the cardioid curved surface receives a pressing force from the outer press unit and the inner press unit, and the cardioid intermediate transmission body comprising a first cardioid intermediate transmission body and a second cardioid intermediate transmission body, the striking curved surface of the first cardioid intermediate transmission body contacting the striking curved surface of the second cardioid intermediate transmission body.

* * * * *